INVENTOR.
MATTHEW P. TUBINIS

BY [signature]

ATTORNEY

May 30, 1961 M. P. TUBINIS 2,986,602

MULTIPLEX COMMUNICATION SYSTEM

Filed Oct. 7, 1958 8 Sheets-Sheet 2

May 30, 1961 M. P. TUBINIS 2,986,602

MULTIPLEX COMMUNICATION SYSTEM

Filed Oct. 7, 1958 8 Sheets-Sheet 3

May 30, 1961 M. P. TUBINIS 2,986,602

MULTIPLEX COMMUNICATION SYSTEM

Filed Oct. 7, 1958 8 Sheets-Sheet 4

May 30, 1961 M. P. TUBINIS 2,986,602

MULTIPLEX COMMUNICATION SYSTEM

Filed Oct. 7, 1958 8 Sheets-Sheet 6

CHANNEL DROP

May 30, 1961 M. P. TUBINIS 2,986,602

MULTIPLEX COMMUNICATION SYSTEM

Filed Oct. 7, 1958 8 Sheets-Sheet 7

2,986,602

MULTIPLEX COMMUNICATION SYSTEM

Matthew P. Tubinis, Penfield, N.Y., assignor to General Dynamics Corporation, Rochester, N.Y., a corporation of Delaware Filed Oct. 7, 1958, Ser. No. 765,871

26 Claims. (Cl. 179—15)

My invention generally relates to systems for transmitting signals and more particularly to systems adapted for transmitting signals between individual ones of a group of commonly terminated trunks and corresponding ones of a group of stations or drops located at points along the length of a common communication channel extending from the common termination point.

In the past, time multiplex transmission systems adapted for signaling between remotely located points have been built in which synchronized transmitters and receivers located at opposite ends of the communication medium are used for transmitting information in one direction only. An example of such a system is found in Patent 2,527,638—Kreer, Jr., et al. While such a system can be expanded to two-way transmission by the obvious expedient of adding a second transmitter and receiver to be companion to the first mentioned receiver and transmitter respectively, and connecting the second transmitter and receiver by a second communication medium, such a solution is not adapted to the case where it is desired to transmit signals between each of a group of trunks terminated at a common point and corresponding ones of a group of drops, particularly when it is further desired that the drops be located on a common communication channel. In the last named case, the necessity for providing both transmitting and receiving signaling apparatus at each drop synchronized with not only the terminating equipment but with transmitting and receiving apparatus at all other stations makes the equipment complex to the point of being impractical when presently known synchronizing techniques are employed.

Accordingly, it is an object of my invention to provide a new and improved transmission system.

Another object of my invention is to provide a new and improved multiplex transmission system.

Another object of my invention is to provide a new and improved system for transmitting signals in both directions between a terminal point and each of a group of drops or stations over a single communication channel.

Another object of my invention is to provide a new and improved system for transmitting signals in both directions between each of a group of trunks terminated at a common point and corresponding ones of a group of drops or stations over a single communication channel.

Another object of my invention is to provide a new and improved system for transmitting multiplex signals between each of a group of trunks terminated at a common point and corresponding ones of a group of drops or stations over a single communication channel.

Another object of my invention is to provide a new and improved system for detecting the failure of repeaters used in multiplex transmission systems.

Another object of my invention is to provide new and improved apparatus for detecting failure in either of a pair of repeaters in a pair of communication channels which are bearing information signals to and from, respectively, a common point.

I accomplish these and other objects by providing a system in which a group of two-way trunks are terminated at a common orifice. The system also includes transmitting means individual to each trunk for converting speech or other signals incoming to each of the terminations from the corresponding trunk into digital, time division multiplex signals, i.e., for assigning a time position different from all other time positions in each of repetitively occurring frames of time positions to the digital signals from each trunk. The multiplexed, digital signals originating at each trunk are transmitted toward a group of drops over a common communication channel extending from the multiplexing means serially through all the drops.

At each of the drops, gating means is provided for diverting signals occupying a particular time position within each frame of signals transmitted over the channel from the office. Receive control means is provided at each drop for driving the gating means in synchronism with the frames of impulses received at the drop, the driving means being kept in step by the synchronizing signals in each received signal frame. The other, undiverted signals of each frame are passed through the gating means to the succeeding drops along the communication channel. Demodulating means at each drop is effective for reconstructing the diverted signals into facsimilies of signals transmitted to the corresponding termination from its trunk. The reconstructed signals are used for driving a signal converting device such as a telephone receiver provided at each drop.

In order to generate speech or other signals similar in nature to those transmitted to the terminations over the aforementioned trunks, means such as a telephone transmitter is provided at each drop. Multiplexing means provided at each drop is driven in synchronism with the signal frames incoming to the drop by the aforementioned receive control means for converting the transmitter signals into digital signals in synchronism with the time position occupied by signals diverted to the aforementioned converting device of the same drop. Gating means at each drop also driven by the receive control means is effective for applying the locally generated digital signals to the common channel beyond the point where signals incoming to the drop were diverted. The signals added at the drop are conveyed along the channel in the same direction as signals transmitted from the terminal point. At a point in the channel beyond each drop, the time position of signals generated within that drop is the same time as the time position of signals incoming from the office and diverted to that same drop.

The channel is effective for conveying signals contributed from the drops in various time positions within repetitive frames to the office receiving means for distribution to appropriate ones of a plurality of receiving means located thereat. Each office receiving means is individual to one of the office trunk transmitting means. Each terminal point receiving means is driven in synchronism with the frames of signals received from the channel by a common receive control means and is effective for passing incoming signals in the appropriate time position to demodulating means individual to each office receive means and each trunk termination. Within each termination, the demodulating means is effective for reconstructing the received digital signals and applying the signals to the two-way trunk for transmission in the office equipment.

In the preferred embodiment of my invention, the channel is a coaxial cable terminated at one end at the office extending serially through the drops in the above-described manner. The cable is further extended to and terminated at the office and connected to the above-described receiving means. Because the cable is looped back on itself, it is practical to run both the portions outgoing from and incoming to the office or terminal point physically parallel to each other and through each of the channel drops. Repeaters are serially connected in the cable portion at each drop. At other points, repeater stations without drop facilities are provided with means in the outgoing and incoming cable portions for repeating signals transmitted along the cable.

With the above-described physical arrangement, I provide, as a further part of my invention, monitoring means individual to each of the pair of repeaters in each repeater point and drop operative for detecting failure of its repeating means to produce signals for a predetermined time interval for transmission along the cable. Each of the monitoring means is effective for operating gating means common to the monitoring means which in turn is effective for establishing a path between the incoming and outgoing portions of the communication channel between the office and the repeater station or drop. In this manner, all signals outgoing from the office which are intended for transmission to the drops beyond the repeaters in which failure has occurred are returned to the office, where alarm apparatus can be provided for detecting the difference in transit time between signals transmitted in the normal manner along the entire length of the cable and signals returned to the terminal point from a defective repeater.

For a better understanding of my invention, I make reference in the detailed description which follows to the drawings attached to and forming a part of the present invention and in which:

Figs. 2–5 show a logic-schematic diagram of office-located multiplex trunk termination equipment and a channel repeater;

Fig. 9 shows the order in which Figs. 2–7 are to be arranged.

*General description*

Figure 1:
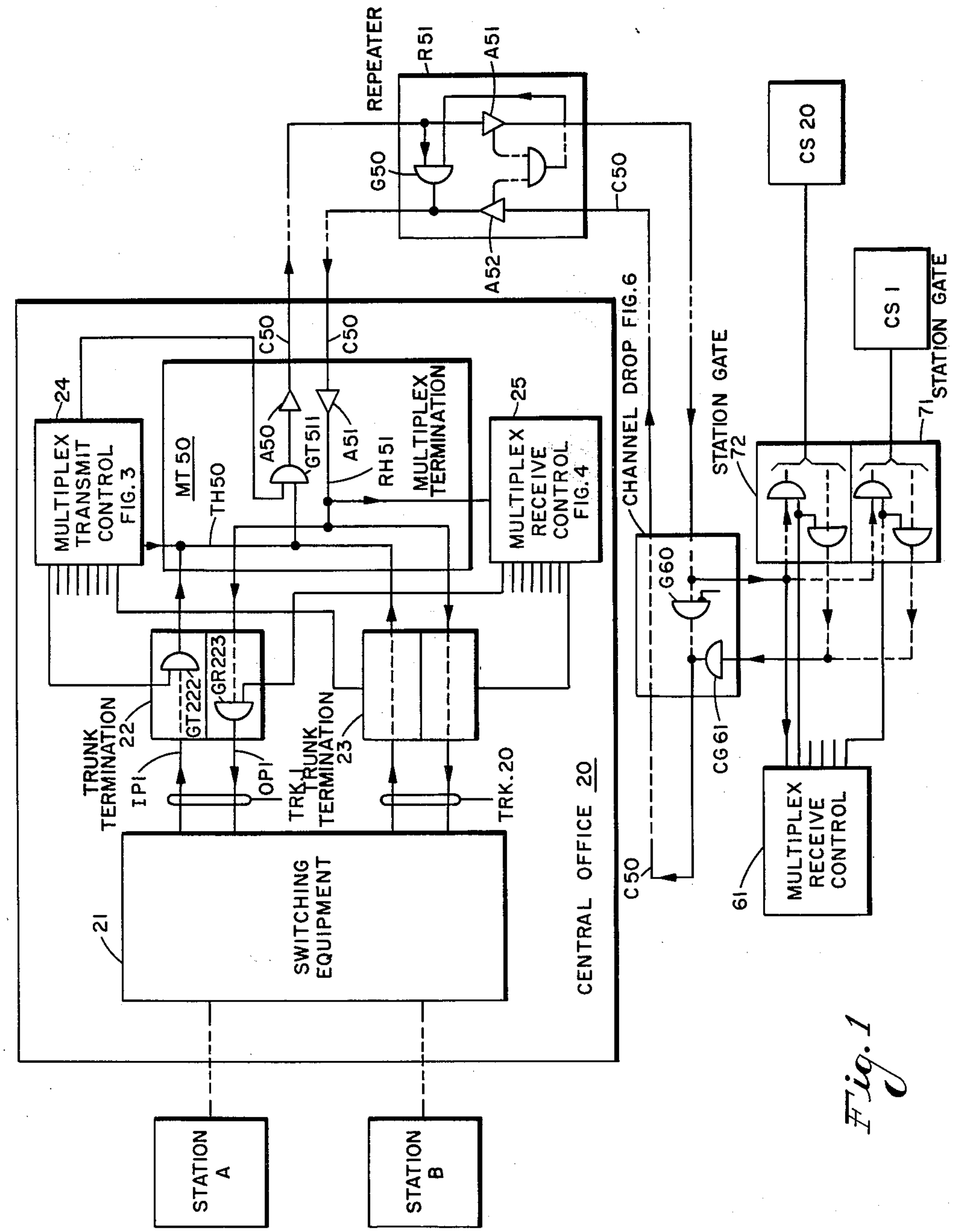
Fig. 1 shows in block form the elements of my system.

Referring to Fig. 1, I provide a central office 20 wherein a group of two-way trunks TRK1–TRK20 are terminated at one end at office switching equipment 21 and are individually extended to terminations 22—23. Switching equipment 21, which can be of any type known to those skilled in the art, is used for directively extending connections between individual ones of trunks TRK1–TRK20 and apparatus, such as subscriber stations A and B, which are connected to switching equipment 21 by lines. For simplicity of description, each trunk is considered to have separate paths for transmitting signals to and receiving signals from its termination. Thus, in the case of trunk TRK1, an incoming path IP1 is used for transmitting speech and other signals from equipment 21 to termination 22, and an outgoing path OP1 is used for transmitting signals from termination 22 to switching equipment 21. Because switching equipment 21 and apparatus other than trunks TRK1–TRK20 terminated thereat do not form a part of my invention, their operation is not further described in the present specification.

Figure 6:
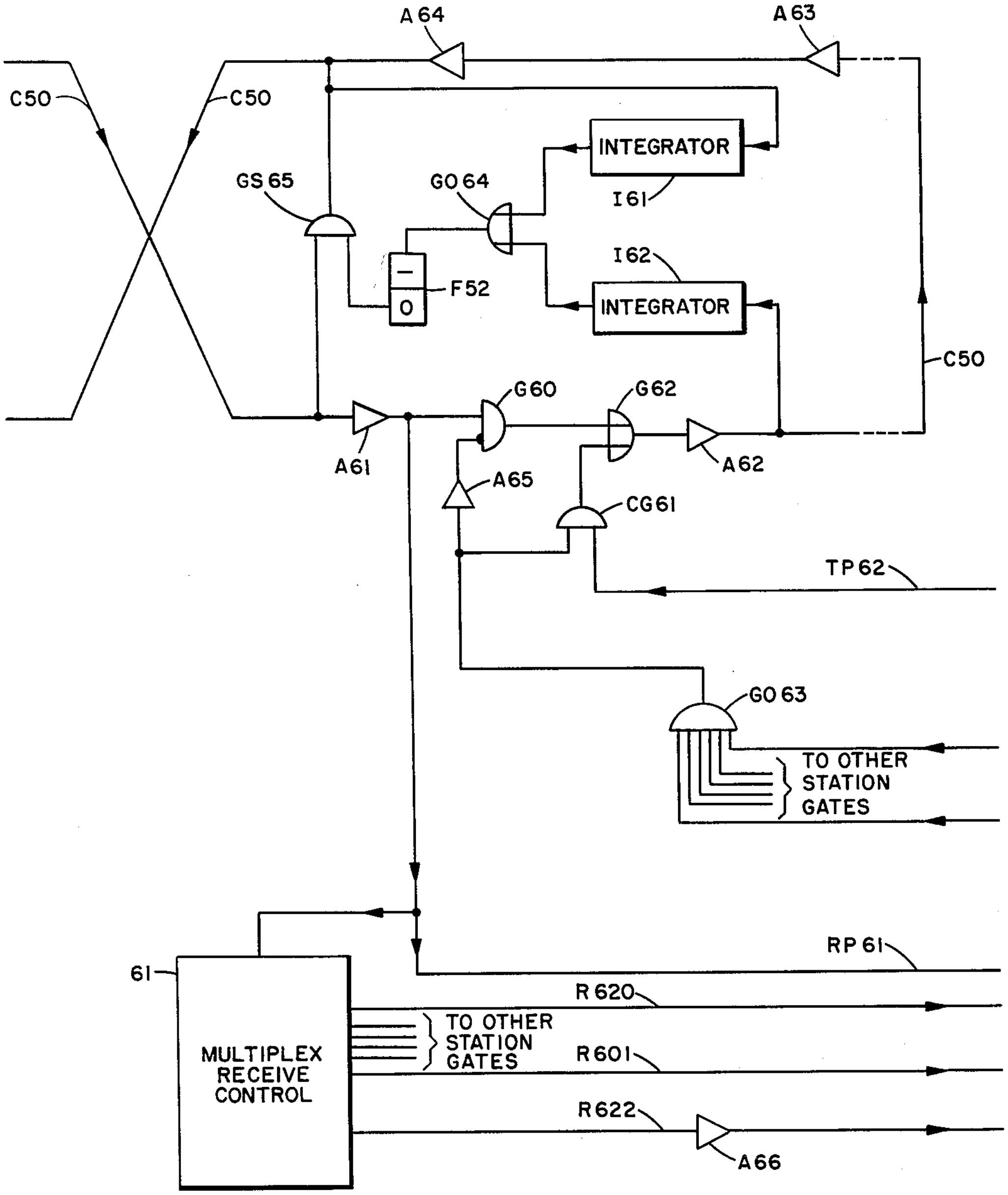
Figs. 6 and 7 show a logic-schematic diagram of a channel drop facility.
Figure 7:
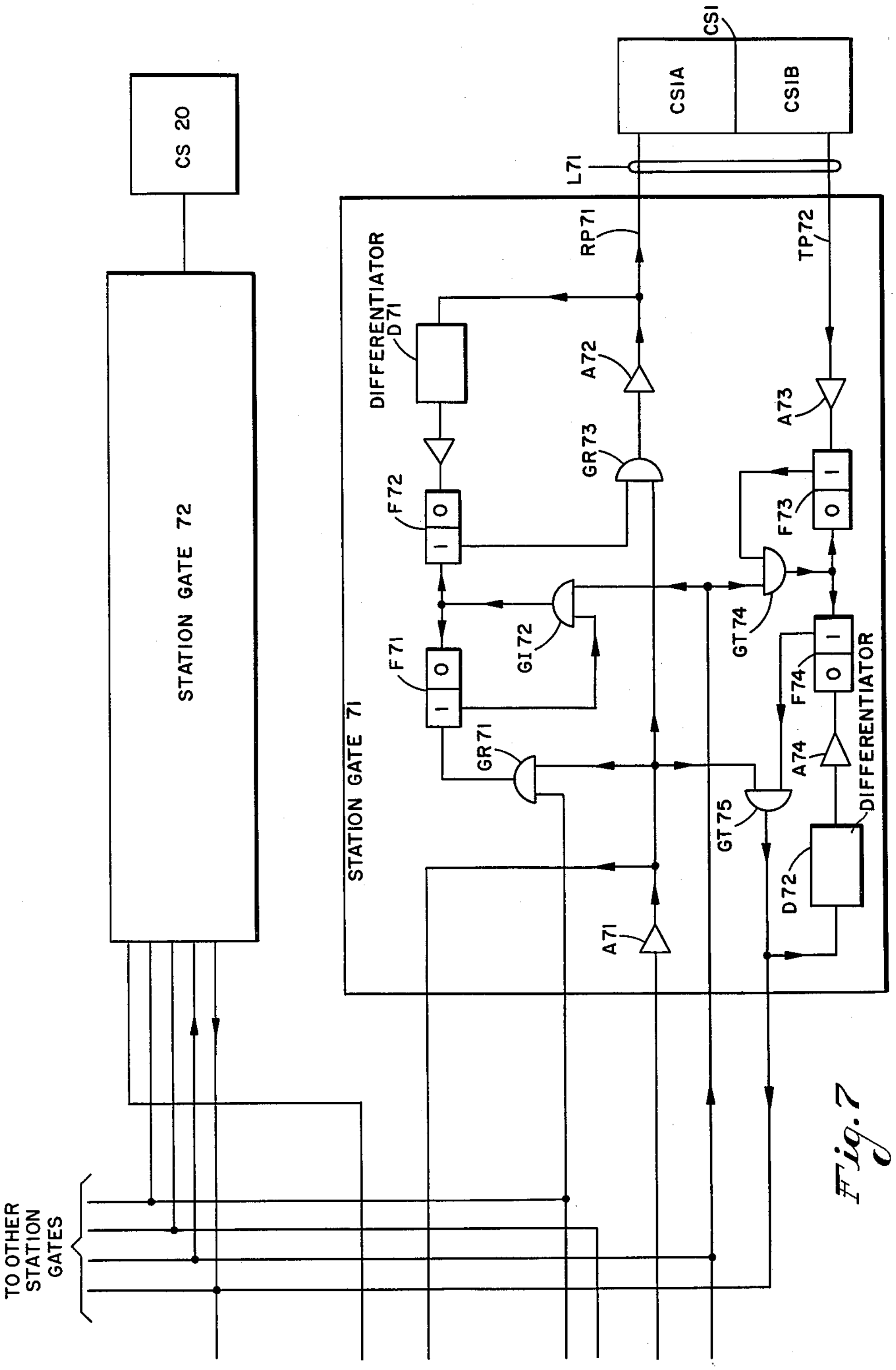

The remainder of the general description and the detailed description which follows are set forth in terms of transmitting signals between trunk termination 22 and channel station CS1 (shown in greater detail in Figs. 6 and 7). It is to be understood, however, that the description is to apply with equal force to the exchange of signals between any other trunk termination and channel station.

Audio frequency speech or other signals from switching equipment 21 transmitted over path IP1 of trunk TRK1 is received at termination 22, where the signals are delta modulated, i.e., converted into digital signals representing the analog signals incoming over path IP1 in time position multiplex fashion. The delta modulating means is driven by the multiplex transmit control 24 shown in greater detail in Fig. 3, which is effective to code the signals from individual ones of the trunk by causing the digital signals from each incoming trunk path including IP1 to be generated in a particular one of the first twenty time positions in each recurring frame of twenty-five time positions defined by the multiplex transmit control.

Gating means within termination 22 is driven by the multiplex transmit control and is effective for admitting the digital signals from the delta modulating means to transmit highway TH50 within the transmitting portion of multiplex termination MT50. Signals present on highway TH50 are applied through transmission gate GT511, which is also controlled by the multiplex transmit control, and amplifier A50 to coaxial cable C50. The multiplex transmit control is also operative for generating and applying to highway TH50 synchronizing signals in the twenty-first and twenty-second signal time positions of recurring signal frames present on highway TH50.

Coaxial cable C50 extends serially through each of a plurality of repeaters such as R51 and channel drops. One or more channel stations, such as CS1 and CS20, may be provided at each drop for utilizing signals transmitted over cable C50 from office 20 in the manner next set forth.

Gate G60 of the drop is normally effective for passing signals incoming on cable C50 from the transmitting portion of termination MT50 along the cable to other drops (not shown). Multiplex receive control 61, synchronized with the repetitive signal frames received from orifice 20, is effective for causing gating means including gate G60 to block and divert from cable C50 signals occupying a particular time position and which are to drive receiving means within channel station CS1. To this end, multiplex receive control 61 is also effective, at the same time that it inhibits gating means including gate G60, for enabling gating means within station gate 71 to pass the signals diverted from cable C50. The digital signals from station gate 71 are passed to receiving means included at channel station CS1 which also has means (not shown) for demodulating the diverted signals and other means coupled thereto, such as a telephone receiver of the well known type, for using the demodulated signal. In this manner, the receiving means of station CS1 reproduces signals received over the incoming path, such as IP1, of trunk TRK1. The remaining signals in each frame of signals transmitted from multiplex termination MT50 may be diverted from cable C50 to other channel stations at the channel drop, such as channel station CS20, or may be passed by gating means G60, as previously mentioned, to other channel drops located along the length of cable C50, where they are diverted to other channel stations in a manner similar to the one discussed above.

In addition to the aforementioned receiving means, station CS1 is equipped with means such as a common telephone transmitter for generating audio frequency signals to be translated into digital signals and transmitted over cable C50 in the same direction as signals transmitted from termination MT50. Cable C50 at a point beyond the channel drop which is most remote from termination MT50 is looped back on itself and again is run serially through all channel drops and repeaters and terminates at receiving apparatus within termination MT50. At this point it is mentioned that while the channel drop is shown as being connected to the leg or other portion of cable C50 outgoing from the transmitting portion of termination MT50, the gating means might be placed in series with the other leg or portion of cable C50 returning to the receiving portion of termination MT50. It is further pointed out that with the above-described facilities, all channel stations may be situated at a single drop facility, as shown in Fig. 1, or may be distributed at a plurality of drop facilities along the length of cable C50.

Returning to the consideration of transmission of signals from channel station CS1 to termination MT50, means in station CS1 is effective for delta modulating (converting into digital signals) the analog signals generated by the transmitter at station CS1. Each of the delta modulated signals are stored by means within station gate 71. The multiplex receive control means 61 at the drop facility controls the station 71 storing means and is effective for coding signals outgoing from gate 71 to cable C50 in the same manner as the code of signals incoming to station gate 71 by causing station gate 71 to spill the signals stored therein through means including control gate CG61 into cable C50 at a point beyond the channel drop facility with respect to the transmitting portion of termination MT50 in the same time positions of each frame defined by control means 61 as the positions occupied by signals incoming to the drop facility and diverted to station CS1. In this manner, signals from each station, such as CS1, incoming from cable C50 to the receiving portion of termination MT50 have been assigned a particular one of the first twenty of twenty-five time positions occurring in each frame of repetitive time positions. At termination MT50 received signals in particular time positions are to be distributed in the next described manner to appropriate ones of trunk terminations 22—23.

Upon their arrival at termination MT50, the signals from cable C50 pass through amplifier A51 and are applied to the receive portion of termination MT50 including receive highway RH51. Highway RH51 extends to the inputs of the receive portions of all of trunk terminations 22—23. The receive portion of each of the trunk terminations such as 22 has means including receive gate GR223. Receive highway RH51 is coupled to the control input of gate GR223 and corresponding gate control inputs in all other trunk terminations. The signal input of each gate such as GR223 is connected to one of the outputs of the multiplex receive control 25 shown in greater detail in Fig. 4.

The multiplex receive control is effective for applying a signal to each of its outputs in synchronism with corresponding time positions of each frame of signals present on highway RH51. As a result, gate GR223 is enabled to pass signals from the individual one of the multiplex receive control outputs only when a signal coincident in time is present on highway RH51. In this manner, digital signals corresponding to digital signals transmitted from station CS1 appear in the output of gate GR223. The output of gate GR222 is coupled to the input of demodulating means within termination 22. The signals produced by the demodulating means within termination 22 are applied to the outgoing path OP1 of trunk TRK1 for transmission to switching equipment 21.

In this manner, signals originating at any other of the channel stations are distributed to the appropriate ones of trunks TRK1–TRK20. Because signals received from any channel station over cable C50 occupy the same time position in each frame of signals as the time position of signals outgoing to cable C50 from the same trunk termination and the incoming signals in any time position are always distributed to the same one of the trunk terminations, intelligence-bearing signals can be sent in both directions between any trunk and the corresponding one of the aforementioned channel stations.

*Detailed description*

The detailed description which follows is confined to a general statement of the function of each of the various components used in the system. Each of the components referred to is of a type well known and understood by those skilled in the communication art. Because my invention is not directed to any individual circuit but, instead, to the combination of circuits, it is not necessary to describe in detail how each circuit functions. Further, reference is made to various gates. Such gates are of types well known to those skilled in the art, and, unless otherwise specified, are of the "and" type. For simplicity of description, all gates are assumed to be responsive to impulses which are positive with respect to a common ground.

*Transmitting from central office equipment*

Figure 2:
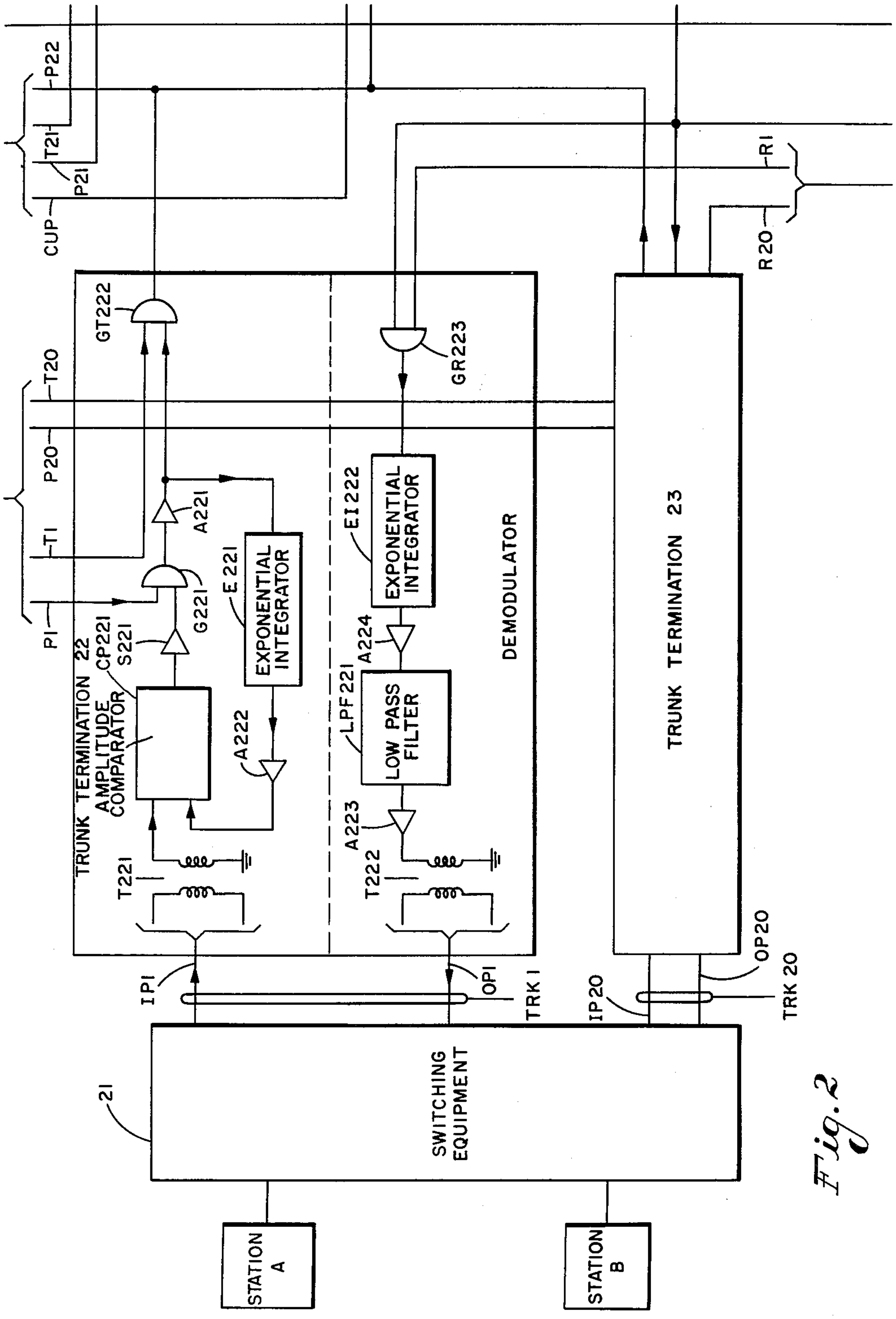

Referring to Fig. 2, trunk TRK1 which extends between switching equipment 21 and termination 22, includes channel IP1 for conveying speech or other audio frequency signals from switching equipment 21 to trunk termination 22. Signals incoming over path IP1 are passed through coupling transformer T221 and applied to the first, upper input of comparator CP221. Assuming for the moment that the amplitude of the signal present on the upper, signal input of comparator CP221 is greater than the amplitude of the signal on the comparator's lower, control input, comparator CP221 passes the signal from path IP1 through switching amplifier S221 to the lower, control input of gate G221.

Gate G221 is effective upon the appearance of the signal on its control input for passing each of regularly recurring .5 microsecond signals which are generated by the multiplex transmit control shown in Fig. 3 (described below) and applied to the upper, signal input of gate G221 over conductor P1, which is an output conductor of the Fig. 3 multiplex transmit control. The .5 microsecond impulses appearing on the output of gate G221 are passed through amplifier A221 and applied to the lower, signal input of transmit gate GT222. The Fig. 3 multiplex transmit control is also operative for applying to conductor T1, a 1 microsecond impulse which overlies the time position of the .5 microsecond impulses present on conductor P1 applied to the signal input of gate G221. The presence of the 1 microsecond impulse on its control gate enables gate GT222 to pass the .5 microsecond impulse applied to the signal input of that gate to transmission highway TH50 with effects which are to be explained presently.

Turning to the consideration of comparator CP221 and its associated apparatus, each .5 microsecond P1 impulse passed through amplifier A221 is also applied to the input of exponential integrator EI221, where it is stored by means not shown. The storing means is arranged to discharge exponentially over an interval marked by a succession of impulses appearing on conductor P1. Other means within integrator EI221 is effective for applying a continuous signal proportional to the value of the signal in the storing means at any instant to the output of integrator EI221. The output signal of integrator EI221 is passed through amplifier A222 in order to restore the signal to a particular reference level and applied to the lower, control input of comparator CP221. Comparator CP221 is effective during the time that the signal applied to its lower, control input is greater than the signal present on the aforementioned signal input for blocking the passage of signals from path IP1 through the comparator and effective, in the above-mentioned manner, to pass signals from path IP1 to the control input of gate G221 when the signal present on the upper, signal input of comparator CP221 is greater than the signal present on its control input. During the period that incoming signals applied to the signal input of comparator CP221 continue to be blocked, the signal stored in integrator EI221 continues to decay to a lower level until comparator CP221 is again enabled to pass signals to gate G221. Restated, comparator CP221 functions as an inhibiting gate which is operative to pass audio signals to the control input of gate G221 only when the amplitude of the input signal is greater than the amplitude of the signal derived from the digital representation of a preceding sample which is present on the comparator's control input. In this manner, the impulses applied to highway TH50 by gate G221 form a digital representation of the analog of speech signals incoming over path IP1.

Figure 3:
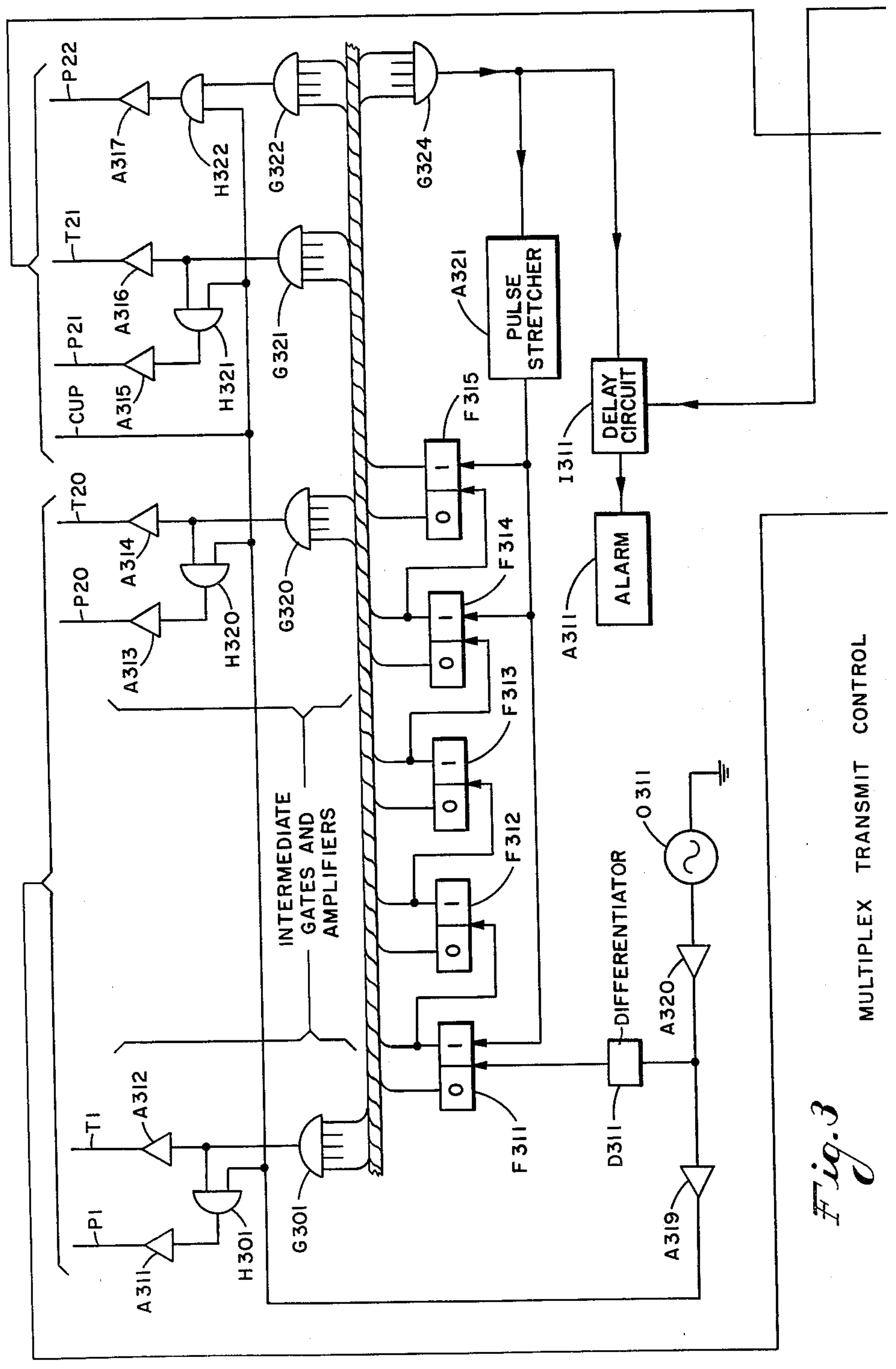

*Office multiplex transmit control.*—In the above explanation, it has been mentioned that the multiplex transmit control shown in Fig. 3 is effective for producing regularly recurring .5 microsecond impulses on conductor P1 and overlapping 1 microsecond impulses on conductor T1, and, further, that digital representations of audio signals incoming over path IP1 of trunk TRK1 are derived from the impulses on conductor P1 and applied to highway TH50. In a like manner, corresponding digital signals are derived from impulses on other P, output conductors, such as P20, emerging from the Fig. 3 multiplex transmit control and the audio signals incoming to the other trunk terminations in the group and applied under the control of impulses on corresponding T conductors, such as T20, to highway TH50. In order to prevent interference between signals applied to highway TH50 from various ones of the trunks, the multiplex transmission control shown in Fig. 3 is arranged to continuously generate and distribute in sequential order impulses to each termination over output conductors corresponding to the aforementioned P1 and T1 conductors. Each complete sequence of distributed signals is hereinafter referred to as a frame of signals. It is to be seen that the signals distributed over pairs of P and T conductors to each termination recur at the rate of 40 kilocycles per second and in a particular time position within each frame of signals. The interval required to produce a single frame of signals is hereinafter referred to as a frame of time positions.

Referring to Fig. 3, all signals in the multiplex transmit control are derived from signals produced by an extremely stable free-running master clock or oscillator O311. Oscillator O311 produces sinusoidal or other shaped signals at a frequency of one megacycle per second. The output of clock O311 is passed through pulse shaping amplifier A320, which emerges as a square wave signal shown graphically in Fig. 8 as "master clock pulses." The output of amplifier A320 is connected to the inputs of differentiator D311 and inverting amplifier A319.

Differentiator D311 is operative for passing only the positive portions of the master clock pulses to the input of F311, which is the first stage of a five stage binary counter comprising flip-flops or other bistable elements F311–F315.

The binary counter is operative in the manner next described for measuring off frames of twenty-five successively occurring master clock pulses. Each stage of the counter has first and second outputs and is capable of passing a positive signal over one of its two outputs in accordance with the condition to which the bistable element is operated. The outputs of the binary counter are connected in various combinations to "and" gates, G301–G324.

Figure 8:
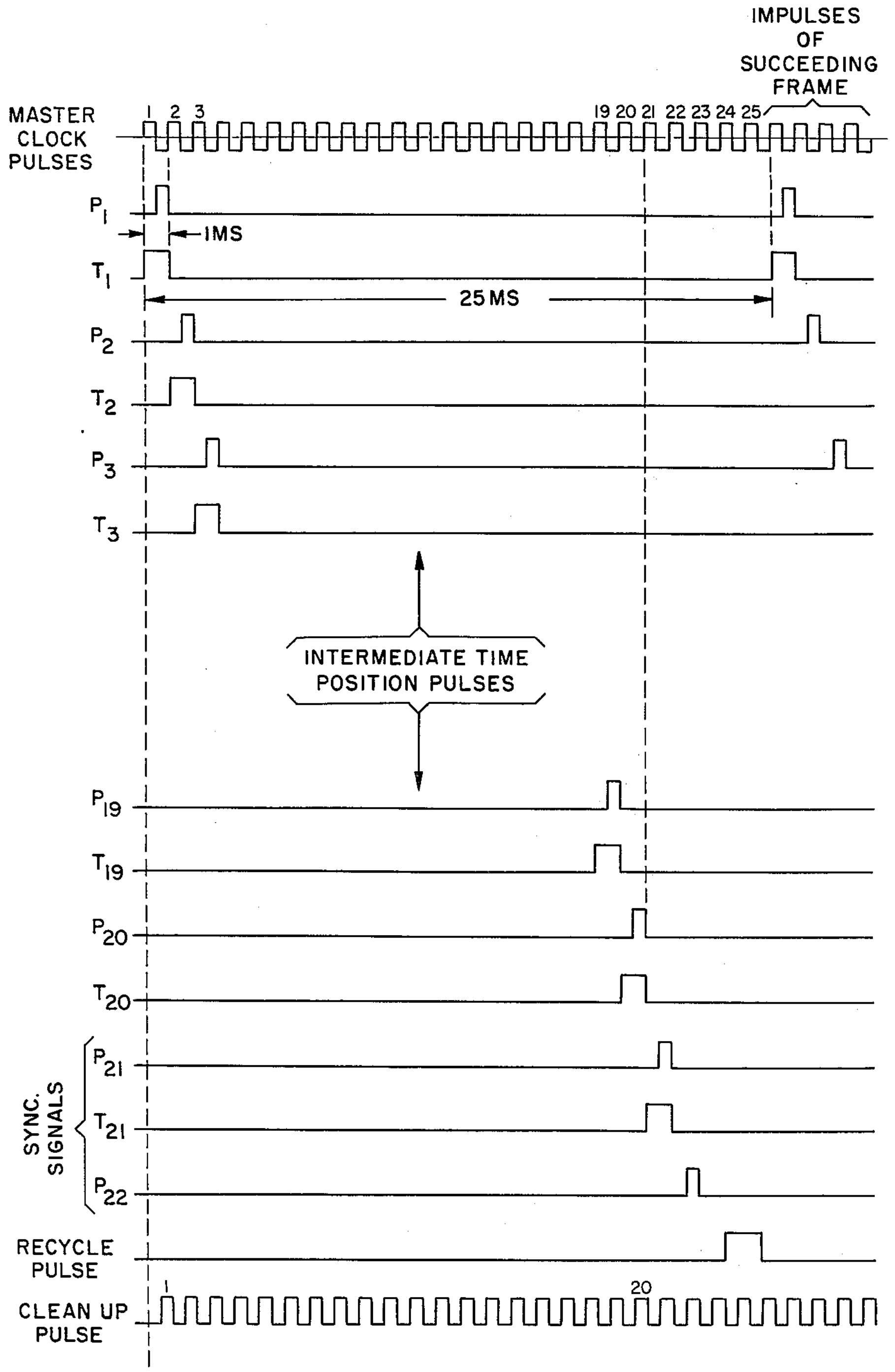
Fig. 8 shows a timing chart.

Referring to the timing chart shown in Fig. 8, the output conductors of elements F311–F315 are connected to the inputs of gates G301–G322 in combinations such that each of gates G301–G322 in succession is enabled to pass a 1 microsecond pulse to its output. The output of each of gates G301–G321 in turn is passed through an amplifier, such as A312, A314, or A316 and applied to the corresponding one of conductors T1–T21. In this manner, it is seen that a positive impulse appears on successive ones of conductors T1–T21 in each of twenty-one successive 1 microsecond time positions. Conductors T1–T20 are connected to corresponding ones of the transmission gates, such as GT222, as indicated in the above paragraphs in connection with transmitting signals from individual trunk terminations to highway TH50. The impulses appearing on conductors T1–T21 are hereinafter referred to as "T impulses."

The outputs of binary counter-elements F311–F315 also are connected to the inputs of gate G324 in such a manner that gate G324 is enabled to pass a positive impulse upon the application of the twenty-fourth successive master clock impulse to first binary element F311. The output of gate G324 is coupled to pulse stretcher A321, which is effective to stretch the pulse for two microseconds (i.e., over successive master clock pulses 24 and 25). The recycle pulse, shown graphically in Fig. 8, produced at the output of pulse stretcher A321 is applied to the resetting terminals of flip-flops F311, F314 and F315 within the binary counter which are in the "1" condition when the twenty-fifth consecutive impulse from differentiator D311 has been applied to element F311. Application of the reset impulse to the resetting terminals of flips flops F311, F314 and F315 restores the binary counter to its "0" condition. Following the removal of the resetting impulse from the binary counter flip-flop resetting terminals, the binary counter is able to measure off the next occurring twenty-five successive master clock impulses. The counter continues to operate in this manner so long as master clock impulses are received from differentiator D311.

The output of gate G324, in addition to being connected to the input of pulse stretcher 324, is also connected to the right-hand input of delay circuit I311. Delay circuit I311 includes means responsive to the receipt of one impulse on its right-hand input every twenty-five milliseconds for withholding a signal from its left-hand output. In the event that the binary counter or the gating apparatus responsible for producing impulses fails, so that gate 324 fails to produce impulses in the above-described manner, the aforementioned means within delay circuit I311 applies a signal to the output of I311 which is applied to and is effective for operating alarm apparatus A311. Alarm apparatus A311 may take any form, and produce signals for the purpose of informing an attendant of the failure of the apparatus.

The output of each of gates G301–G321 and gate G322 is also coupled to the control input of a corresponding one of gates H301–H322. Each of these gates is thereby enabled during the same period that a T impulse is being applied to the corresponding one of the T output conductors of the Fig. 3 multiplex control. The signal inputs of gates H301–H323 are connected together and to the output of the previously mentioned inverting amplifier A319. Inverting amplifier A319 is effective in response to the negative portions of the master clock impulses applied to its input for producing corresponding series of .5 microsecond positive impulses at its output which are in phase with the negative input impulses.

Again referring to Fig. 3, each of gates H301–H323 enabled in sequence in the above-described manner, is effective for passing one of the first twenty-two .5 microsecond impulses of each frame of impulses produced by amplifier A319 to the corresponding one of conductors P1–P21 by way of one of amplifiers, such as A311, A313, A315 and A317. Further, each of the gates H301–H322 passes its pulse during the last half of the interval that a signal is present on the output of the corresponding one of gates G301–G322. Considering any pair of P and T conductors, such as P1 and T1, a .5 microsecond impulse exists on the P conductor during the last half of the 1 microsecond impulse present on the T conductor. Considering all pairs of P and T conductors, the multiplex transmit control of Fig. 3 is effective for producing impulses on each pair of P and T conductors in one of the firt twenty-one time positions occurring throughout each successive frame of twenty-five 1 microsecond time positions. A .5 microsecond impulse is produced in the same fashion, in the twenty-second time position of each successive frame of time positions at the output of gate H322 and passed through amplifier A317 to conductor P22.

Turning to the consideration of the Fig. 3 multiplex transmit control in combination with the trunk terminations, it is now apparent that impulses conveyed to each termination, such as 22, over the corresponding pair of P and T conductors, such as P1 and T1, cause the above-described delta modulating means in each of trunk terminations to be made operative during one and only one of the first twenty in each repetitive frame of twenty-five time positions defined by the Fig. 3 mutiplex transmit control. Consequently, digital signals representing the audio frequency signals incoming from switching equipment 21 to each trunk termination over a path, such as IP1, appear in a particular time position on transmission highway TH50. The time position assigned to each trunk is separate and distinct from all other time positions, so that the digital signals originating at any one termination do not interfere with digital signals from any other termination, and further so that digital signals in any one time position can be picked off and reconverted into audio signals in the manner to be described presently.

*Synchronizing impulses.*—In the above description, it has been assumed that the first twenty of the twenty-five time positions in each frame are to be used for controlling signals from corresponding ones of twenty trunks and trunk terminations. Also, it has been shown how the twenty-fourth and twenty-fifth time positions are utilized for restoring binary counter elements F311–F315 to zero condition. The twenty-first and twenty-second time positions of each frame are occupied by digital signals to be used for synchronizing multiplex receive control units, such as the one shown in Fig. 4, in the manner and for reasons hereinafter set forth.

The twenty-first time position in each frame is reserved for a digital signal representing the analog voltage produced by synchronizing signal source SS51 which includes mixed audio tone generator AT51. Generator AT51 is coupled by transformer T51 to the signal input of delta modulator DM51, while conductors P21 and T21 of the Fig. 3 multiplex transmit control are connected to the gating means within delta modulator DM51, which includes transmission gate GT521, within synchronizing signal source SS51. Modulator DM51 operates in substantially the same fashion as the previously described delta modulator within termination 22. The output signals of modulator DM51 are applied to highway TH50 through transmission gate GT522 which is enabled in the same manner as that described in connection with transmission gate GT222 within trunk termination 22. A separate, unmodulated pulse is applied to highway TH50 in the twenty-second time position of each signal frame by coupling conductor P22 to highway TH50. The use of synchronizing signals appearing in time positions 21 and 22 is to be explained later in this description.

*Transmitting signals to the coaxial cable.*—Transmission highway TH50 is connected to the signal input of transmission gate GT511 within multiplex termination MT50. The control input of GT511 is connected by conductor CUP to the output of the aforementioned inverting amplifier A319. It is to be recalled that .0 microsecond impulses in each time position of the frames of signals produced by the multiplex transmit control of Fig. 3 is in coincidence with one of the output impulses of amplifier A319 and which appear on conductor CUP. As a result, gate GT511 is enabled in every time position occurring in each frame of signals to pass digital signals, if such signals exist, from transmission highway TH50 through amplifier A50 to coaxial cable C50. Cable C50 extends from the output of amplifier A50 serially through other amplifiers, such as A51 within repeater R51, and the various ones of channel drops, such as the one shown in Fig. 6, and returns by way of amplifiers, such as A52, within the same drops and repeaters to the signal receiving means within termination MT50.

*Receiving at the central office equipment*

Thus far in the description, it has been set forth how frames of signals are transmitted from the trunk terminations to cable C50 and how signals at any particular time position digitally represent the analog of audio frequency voltage present on the corresponding one of the incoming paths of trunks, such as TRK1. The manner in which such signals are picked off and utilized at channel drops at various points along channel C50 is to be described presently, but first, in order to aid in this description, the operation of the receiving apparatus of termination MT50 and trunk terminations and particularly the companion multiplex receive control apparatus shown in Fig. 4 are described.

Signals incoming to the receive portion of termination MT50 over the lower part of cable C50 are passed through amplifier A53 and applied to highway RH51. For the present, it is sufficient to say that signals appearing on highway RH51 may occur in each of the first twenty-one of twenty-five .5 microsecond time positions, the time positions of adjacent signals in each frame being separated from each other by .5 microseconds. The signals present in the twenty-first time position and a .5 microsecond signal present in the twenty-second time position of each signal frame are the signals applied to cable C50 by delta modulator DM51 and conductor P22 of the Fig. 3 multiplex transmit control, respectively. The signals in each of the first twenty time positions of each frame are to be distributed to each corresponding trunk termination. For instance, signals in the first time position of each frame are to be passed to the receive portion of termination 22.

Figure 4:
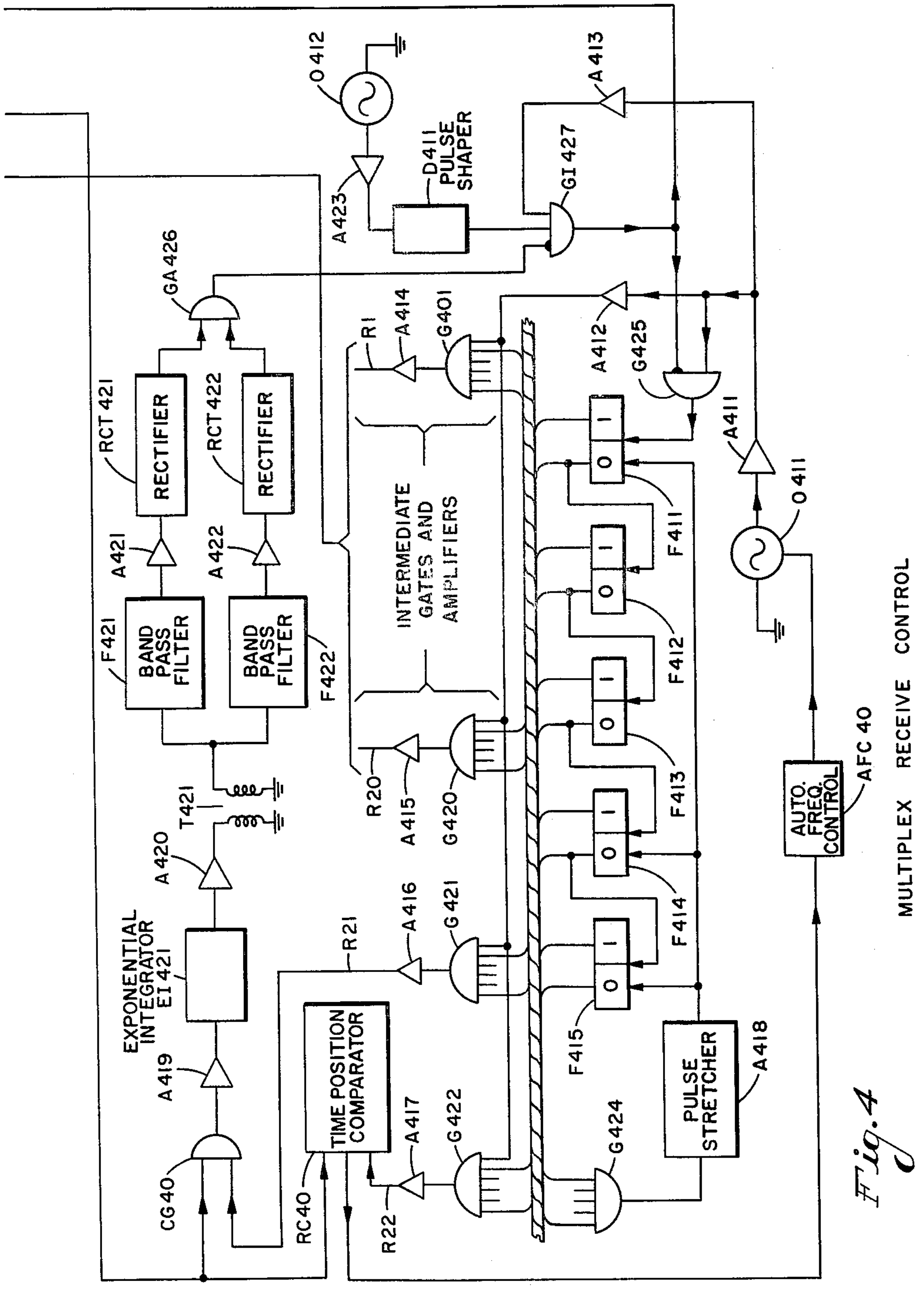
Figures 5, 9:
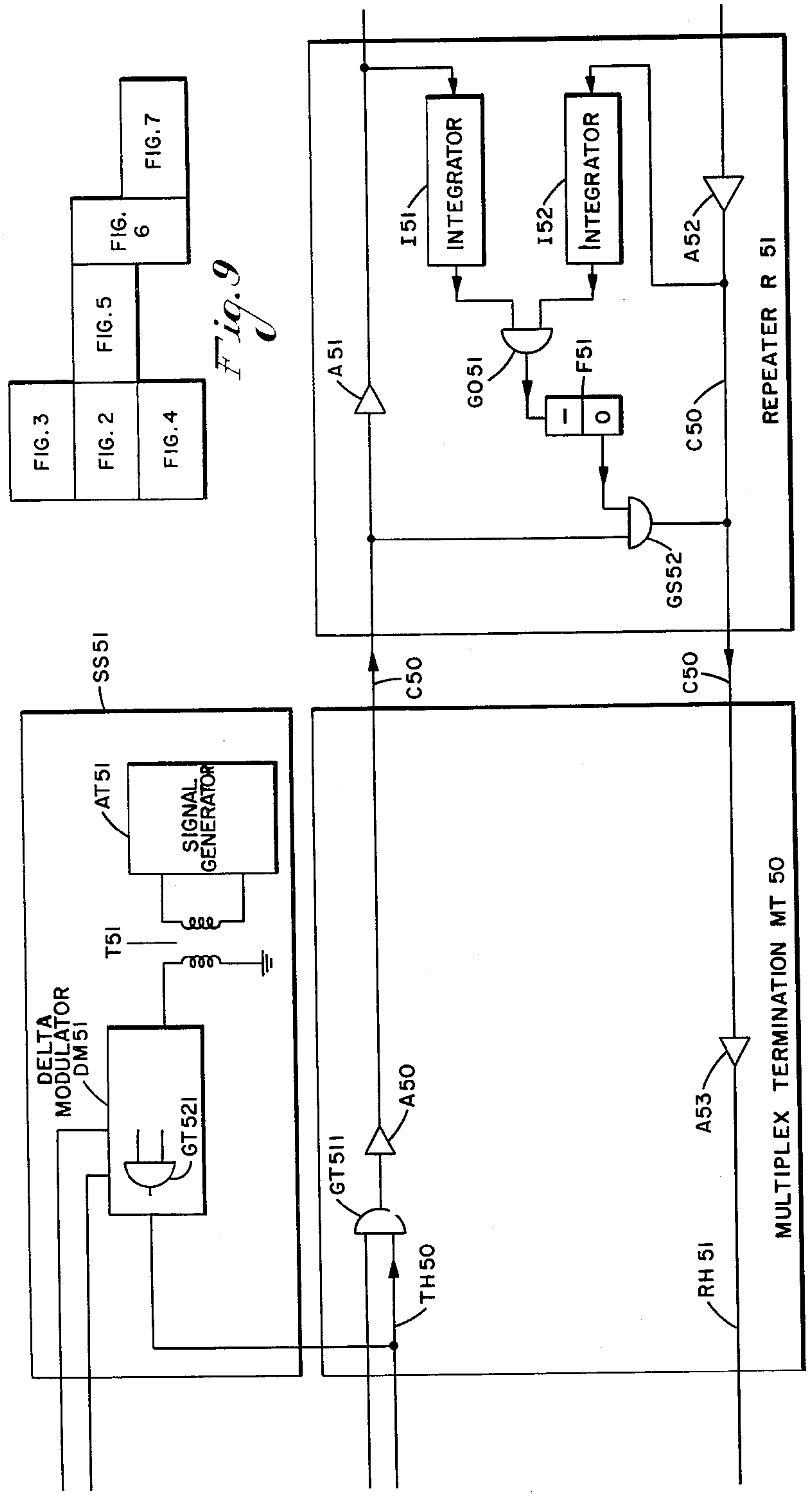

The Fig. 4 multiplex receive control is effective for synchronizing the receiving apparatus in each trunk termination with frames of signals incoming to the trunk terminations from cable C50 by sequentially distributing enabling signals, which are coincident with the various time positions within each repetitive frame incoming from cable C50, to gatng means, such as GR223, within each of trunk terminations 22—23 and to other apparatus yet to be described.

For reasons that will be apparent presently, it is necessary to provide a multiplex receive control at each channel drop facility, such as 61, shown in Fig. 6. Because the drop facility multiplex control at each station is similar in structure and function to the one shown in Fig. 4, a single description of the details of the Fig. 4 multiplex receive control is sufficient to cover all cases, except where specifically noted in the succeeding sections of this description.

Within each repetitive frame incoming from cable C50 to the receive portion of termination MT50, the individual time positions are equal in number and width to the time positions in each frame of time positions defined at the transmit portion of termination MT50 to cable C50. The above-described synchronizing signals in the twenty-first and twenty-second time position in each frame of signals transmitted from termination MT50 are transmitted along the entire length of cable C50 and received, along with signals in other time positions, at the receiving portion of termination MT50. Such received frames of signals are passed through amplifier A53 and appear on receive highway RH51. As previously explained, highway RH51 is connected to the inputs of the receiving portions of trunk terminations 22—23, so that highway RH50 is effective for delivering all incoming signals from cable C50 to the receive portions of all the trunk terminations, 22—23.

Again referring specifically to termination 22, the signals on highway RH50 are applied to the control input of receive gate GR223, with the result that gate GR223 is enabled to pass signals from its signal input to its output upon the coincident application of signals to the gate's signal input. The multiplex receive control of Fig. 4 is provided for applying such repetitive signals to the input of the receiving gate, such as GR223, of each trunk in the time position within each received frame of signals occupied by signals intended for transmission to the corresponding outgoing trunk path, such as OP1, in the case of termination 22.

Restated, each signal in each of the first twenty time positions of each frame present on highway RH50 is intended for transmission through a particular trunk termination. Accordingly, each signal is effective to enable the receive gate of each trunk termination to pass coincident signal from the Fig. 4 receive multiplex control applied to the signal input of the same gate. Only when signals coincide on the control and signal inputs of the receive gate of any one trunk does a signal appear on the output of that gate. It is a function of the Fig. 4 multiplex receive control to apply signals to the signal input of each trunk receive gate in time position corresponding to the time position of signals transmitted to cable C50 from the transmission gate of the same trunk and in coincidence with the corresponding time position of frames of signals received at termination MT50 from cable C50.

*Multiplex receive control.*—From the above description, it is obvious that if the signals appearing in a particular time position of each frame of signals appearing on highway RH50 are to enable the receive gate of a particular trunk in the above-described manner in order to produce a signal on the receive gate output of any trunk termination, such as 22, then the Fig. 4 multiplex receive control not only must produce repetitive frames of signals in time positions one through twenty-five at the same rate as the rate of appearance of time positions on the highway RH50, but it must also provide signals within each frame produced of substantially the same width and in coincidence with the corresponding time position signals within each frame appearing on highway RH50. The multiplex receive control including the apparatus for synchronizing the multiplex receive control generator with frames of incoming signals is next described.

The Fig. 4 multiplex receive control includes a first, high frequency oscillator O411 for producing signals at the same rate (1 megacycle per second) as oscillator O311 of the multiplex transmit control. The output signals of oscillator O411 are passed through shaping and differentiating amplifier A411 and emerge as square wave impulses of .5 microsecond duration. The square wave impulses from amplifier A411 are applied to the signal input of inhibiting gate G425. Assuming for the present that gate G425 is enabled, impulses from amplifier A411 are passed through gate G425 to the input of the first stage of a five stage binary counter including flip-flops or other bistable elements F411, F412, F413, F414 and F415. The Fig. 4 multiplex control is similar in structure and function to the one described in connection with the Fig. 3 multiplex transmit control, and therefore is not described further at this point.

The outputs of counter elements F411–F415 are connected in combination to the inputs of gate G424, which is analogous to gate G324 of the Fig. 3 multiplex transmit control, in such a manner that gate G424 produces a .5 microsecond impulse on its output upon application of the twenty-fourth impulse of each frame of twenty-five consecutive impulses to the input of binary element F411. The output of gate G424 is connected to pulse stretcher A418, where the impulse is stretched over the twenty-fourth and twenty-fifth impulses of each frame of twenty-five consecutive impulses applied to binary element F411. Pulse stretcher A418 is effective during this twenty-fourth and twenty-fifth impulses for applying an impulse to the reset inputs of each of elements F411, F414 and F415, which are then in the "1" condition, thereby returning all elements of the binary counter to "0" condition. In this manner, the binary counter continues to operate so long as signals are produced by oscillator O411 and applied to the signal input of binary counter element F411.

Returning to the consideration of amplifier A411, the square wave signal from amplifier A411 is applied to the input of inverting amplifier A412, which produces at its output a series of positive signals coincident with the negative input signals. The output of amplifier A412 is coupled to the signal input of each of gates G401–G422. The outputs of elements F411–F415 are connected in various combinations to the control inputs of gates G401–G422 in such a manner that each of gates G401–G422 is sequentially enabled to pass one of the first twenty-two of each frame of twenty-five consecutive .5 microsecond impulses produced at the output of amplifier A412. The signals produced at the output of each of gates G401–G420 are passed through the corresponding one of amplifiers A414–A415. The output of each one of amplifiers A414–A415 is individually coupled to one of conductors R1–R20. Conductors R1–R20 are individually connected to the signal inputs of receive gates, such as GR223, in each of the trunk terminations. In this manner, .5 microsecond impulses are made to appear sequentially on each of conductors R1–R20 in the same manner that impulses produced by the Fig. 3 multiplex transmit control appear sequentially on each of conductors P1–P20 in the manner graphically shown in Fig. 8.

*Passing incoming signals through trunk terminations.*—It is next assumed that the above-described Fig. 4 multiplex receive control is sequentially producing .5 microsecond impulses on each of its output conductors R1–R20, and, for the present, that the impulses on each of conductors R1–R20 is coincident with the corresponding one of the first twenty time positions of each frame of twenty-five .5 microsecond time positions occurring on receive highway RH51. Again referring to the case of trunk termination 22, the .5 microsecond impulse on conductor R1 and the signal input of receive gate GR223 within the receiving portion of trunk termination 22, is passed through gate GR223 to the input of exponential integrator EI223 if a signal is present on highway RH51 in the first time position. The presence or absence of a digital signal in the first time position of each frame of signals on highway RH51 is indicated by the presence or absence of a signal at the input of integrator EI221.

Integrator EI222 is effective for converting the digital signals applied to its input into an audio frequency signal at the integrator output. The integrator output signal is a replica of the signal from which the digital signals are derived (the apparatus for deriving such signals is described hereinafter in connection with the channel drops). The output signal from integrator EI222 is passed through amplifier A224 and low pass filter LPF221 in order to remove any high frequency components derived from the digital input signals. The output signals from filter LPF221 are reamplified by being passed through amplifier A223 and applied to the outgoing path OP1 of trunk TRK1 through coupling transformer T222, amplifier A223 being provided in order to achieve an impedance match between the signal source and the line.

*Synchronizing multiplex receive control impluses with incoming signal frames.*—While oscillator O411 within the Fig. 4 multiplex receive control is carefully stabilized, it is free-running and may drift from the frequency of oscillator O311 of the Fig. 3 multiplex transmit control, which supplies signals to apparatus for deriving frames of impulses to be transmitted over cable C50. Similarly interruptions in signals transmitted over cable C50 may cause the binary counter within the Fig. 4 multiplex receive control to break step with signal frames received at termination MT50 and applied in the above-described manner to highway RH51. From the above paragraphs, it is obvious that the oscillator O411 and the binary counter of the Fig. 4 multiplex receive control must be operated in step with signals and time positions derived from oscillator O311 and the counter of the Fig. 3 multiplex transmit control as the signals derived from their operation appear on highway RH51 if the signals applied to conductors R1–R20 are to be used to distribute signals in the various time positions of frames of signals appearing on highway RH51 to the ones of the trunk terminations for which they are intended. Accordingly, receive highway RH51, in addition to being coupled to the control inputs of the receive gate in each trunk termination, is also coupled to the signal input of receive comparator RC40 and the control input of control gate CG40, both comparator RC40 and gate CG40 being included in the synchronizing apparatus of the Fig. 4 multiplex receive control. It is to be recalled that the signal in the twenty-first time position of each frame of signals transmitted from the Fig. 3 multiplex transmit control and subsequently applied to highway RH51 is the digital representation of a compound or mixed audio tone produced by generator AT51, and that the signal in the twenty-second time position of each frame similarly produced and applied to highway RH51 is a digital impulse recurring in each frame.

It is the purpose of the twenty-first time position signals representing the mixed audio tone to provide an identifying signal which controls the part of the signal synchronizing apparatus in the Fig. 4 multiplex receive control used for controlling the stepping of the binary counter including elements F411–F415. The twenty-second position, constantly recurring digital signal is provided for controlling that part of the synchronizing apparatus including comparator RC40 which is effective for controlling the frequency of signals produced by oscillator O411. By controlling the oscillator O411 separately from the binary counter, the Fig. 4 multiplex receive control may be kept in step with frames of signals received on highway RH51, even though the synchronizing signal in the twenty-first time position periodically disappears owing to the nature of the source of the twenty-first position digital signal.

First considering the control of the binary counter, it is pointed out that the binary counter can continue to be operated in the above-described manner in response to the application of each impulse produced at the output of amplifier A411 and applied through gate G425 to the first stage element F411 of the binary counter. Should the impulses at each of conductors R1–R22 of the multiplex receive control be out of step with corresponding time positions present on highway RH51, it is desired to periodically slip the binary counter one step (i.e., to cause the binary counter to ignore a single input impulse from amplifier A411) until the signals in each frame of signals produced on conductors R1–R22 again are in coincidence with the time positions of each frame of signals present on highway RH51.

In the above paragraphs it has been stated that signals appearing at the output of amplifier A411 are passed through gate G425 to the input of binary counter element F411. Gate G425 is of the so-called inhibiting type, which is enabled to pass signals to its output only in the absence of a signal on its upper, control input. When the binary counter of the Fig. 4 multiplex receive control is out of step, a single .5 microsecond impulse is applied every 500 microseconds to the control input of gate G425 in coincidence with the signal applied in the previously described manner to the signal input of gate G425. The manner in which the inhibiting pulse is applied is next described.

In addition to being coupled to the input of amplifier A412 and the signal input of gate G425 in the above-described manner, the output of amplifier A411 is passed through amplifier A413 and applied to the signal input of inhibiting gate GI427. Gate GI427 is enabled to pass a signal from its signal input to its output only in the absence of a signal from its left-hand control input and upon the application of an enabling signal to its center, control input. The output of gate GI427 is connected to the control input of gate G425, so that when gate GI427 is enabled in the manner yet to be described, gate G425 blocks the passage of signals from oscillator O411 to the input of binary counter element F411, and the binary counter is held in its then-operated condition until the blocking signal is removed from the inhibiting input of gate G425.

Turning to the consideration of control gate CG40, and assuming that the synchronizing signal in the twenty-first time position is present on highway RH51, and further that the signal applied to the signal input of gate CG40 coincides with the signal produced by the binary counter and applied by conductor R21 to the control input of gate CG40, gate CG40 is enabled to pass .5 microsecond signals in the twenty-first time position of signal frames present on highway RH51. The resulting signal appearing on the output of gate CG40 is passed through amplifier A419. The signal appearing on the output of amplifier A419 is passed through exponential integrator EI421, where it is transformed from a series of digital signals into an analog voltage in the same manner as that described in connection with exponential integrator EI221 in trunk termination 22.

The analog signal at the output of integrator EI421 is a replica of the signal produced by audio tone generator AT51. The signal replica is passed through amplifier A420 and applied through coupling transformer T421 to the inputs of bandpass filter F421 and F422, respectively. Filters F421 and F422, which are designed to pass signals of the same frequencies as the components of the tone generated in AT51, effectively separate the components of high and low frequency present in the mixed audio tone produced by integrator EI421. The high and low frequency components appearing at the outputs of filters F421 and F422, respectively, are passed through amplifiers A421 and A 422 and applied to the inputs of rectifiers RCT421 and RCT422, respectively. Each of rectifiers RCT421 and RCT422 is effective for producing a steady signal at its output in response to the application of an A.C. signal to its input.

From the above considerations, it is seen that the coincidence of the twenty-first time position signal applied to conductor R21 of the Fig. 4 mulitplex receive control with the signal in the twenty-first time position of frames of signals present on highway RH51 results in the appearance of continuous signals at the outputs of rectifiers RCT421 and RCT422. The appearance of such signals indicate that the binary counter of the Fig. 4 multiplex receive control should continue to count without interruption. Accordingly, the outputs of rectifiers RCT421 and RCT422 are connected to the inputs of "and" gate GA426, the output of gate GA426 being connected to the inhibiting input of gate GI427. Gate GI427 is maintained in blocked condition so long as the twenty-first time position impulses within frames of signals appearing on highway RH51 coincide with the impulses produced on conductor R21 of the Fig. 4 multiplex receive control. Under these conditions, amplifier A411 continues to feed driving impulses to the first stage binary counter element F411 through gate G425.

Assuming that the twenty-first time position signal present on highway RH21 is not coincident in time with the impulse on conductor R21, gate CG40 is not enabled to pass the digital signal representing the mixed audio tone derived from generator AT51. While gate CG40 may be enabled to pass some other digital signal, the high and low frequency components of the replica signal produced by integrator EI421 can be assumed to have components which are not passed through filters F421 and F422. While it is possible that the required frequency components produced by integrator EI421 during the time that the Fig. 4 multiplex binary counter is out of step with the signals on highway RH51 and that such components would be passed through filters F421 and F422 for a short time, the continued production of the required signals at the outputs of both filters F421 and F422 for any substantial length of time can be assumed to be impossible for all practical purposes.

The loss of signals at the outputs of either or both filters F421 and F422 results in the removal of a signal from the output of gate GA426 and, consequently, the removal of signal from the left-hand, inhibiting input of gate GI427. Gate GI427 thereupon is free to respond to signals applied to its center, control input and to its right-hand, signal input in the manner next described.

Within Fig. 4 multiplex receive control, means including a low speed oscillator O412 and pulse shaper D411 is provided for supplying an impulse every 500 microseconds. This impulse, which is substantially greater than one microsecond in width is applied to the signal input of gate GI427 with results to be explained presently. Oscillator O412 produces a signal at the rate of .5 kilocycle per second. The output of oscillator O412 is passed through differentiating amplifier A423 which selects and amplifies only the positive portions of the impulses produced by oscillator O412. These 500 microsecond impulses are applied to the input of pulse shaper D411 which is effective in response to the application of each impulse to its input for producing at its output an impulse between one and two microseconds in width which are applied to the signal input of gate GI427. It is now apparent that gate GI427 is enabled to pass single impulses from amplifier A411 to the inhibiting input of gate G425 for a less than two microsecond period occurring every 500 microseconds when a signal is removed from the inhibiting gate GI427. Accordingly, a series of single impulses from amplifier A411 passed by gate GI427 are applied to the inhibiting input of gate G425 during the period that the binary counter of Fig. 4 is out of step with the signal frames present on highway RH51.

The blocking of the impulse from amplifier A411 intended for application to the binary element F411 input at gate G425 is effective for holding the binary counter in its then-operated condition. Upon the removal of the enabling signal from the control input of gate GI427, passage of further inhibiting signals to gate G425 is prevented, so that gate G425 is again enabled to pass impulses to the input of bistable element F411. The counting process resumes in the counter until the production of the next impulse at the output of shaper D411, when the slipping impulse is again passed through gate GI427 to inhibiting gate G425. The slipping process is repeated until the impulse produced on conductor R21 by the counter coincides with the digital synchronizing signal in the twenty-first position of each signal frame present on highway RH51, at which time the signal appearing at the left-hand inhibiting input of gate GI427 blocks the further passage of slipping impulses to gate G425.

Turning next to the frequency control of oscillator O411, comparator RC40 includes means for measuring frequency differences between the constantly recurring twenty-second pulse in each frame of signals present on highway RH51 and the impulse present on conductor R22 of the Fig. 4 multiplex receive control which is connected to the lower input of comparator RC40 by amplifier A417. Comparator RC40 has means responsive to the signal produced by the frequency difference measuring means for producing on its output a voltage proportional to the change in phase difference between signals applied to its upper and lower inputs. The output of comparator RC40 is connected to automatic frequency control AFC40, which is effective in response to signals applied to its input for applying a correcting signal to a control point within oscillator O411. The frequency of signals produced by oscillator O411 and applied to the amplifier A411 input is thereby maintained substantially the same as the frequency of signals produced by oscillator O311.

The stability of oscillator O411 can be made such that the absence of several synchronizing impules in time position 22 on highway RH51 does not cause the receiver to stop tracking. However, the loss of the compound audio signal over an extended number of signal frames causes the binary counter to move out of synchronization with the signal frames present on highway RH51. Such excessive correction of the binary counter is indicated by the presence of more than a predetermined number of impulses applied to the inhibiting input of gate G425 within a predetermined time period. Accordingly, the output of gate GI427 is also connected to a separate input of the delay circuit I311 in the multiplex transmit control where counting means responds to such signals and is effective in response to the receipt of more than a predetermined number of such signals for causing alarm A311 to produce an output signal.

From the above paragraphs, it is seen that the Fig. 4 multiplex receive control binary counter automatically aligns itself whenever it is placed in operation. Should noise or other spurious signals cause the Fig. 4 multiplex receive control binary counter signals to become nonsynchronous with frames of signals present on highway RH51, the synchronizing equipment within the multiplex receive control causes the equipment to hunt until the binary counter is again synchronized with frames of time positions defined on highway RH51.

*Receiving signals at a channel drop*

Thus far the description of my invention has dealt entirely with the transmission of signals between trunk terminations, such as 22, and cable C50 via muliplex termination MT50. The transmission of signals between cable C50 and the channel drops through which cable C50 extends is next considered. The repeaters, such as R51, through which the portions of cable C50 bearing signals incoming to and outgoing from multiplex termination MT50 extend enroute to the channel drops, are dismissed for now except to say that it is assumed that frames of signals applied to cable C50 at the transmit portion of termination MT50 are passed through amplifier A51 and applied to the input of amplifier A61 of the Fig. 6 channel drop, and that signals appearing at the output of channel drop amplifier A64 are passed by repeater amplifier A52 to the input of amplifier A53 within the receive portion of multiplex termination MT50.

Signals in particular time positions in frames of signals transmitted from amplifier A50 of multiplex termination MT50 are intended to be received at a particular channel station, such as CS1, which is located at one of a number of channel drops, such as the one shown in Fig. 6 distributed along the length of cable C50. Referring to Fig. 6, signals from termination MT50 are passed through amplifier A61 and applied to the signal input of inhibiting gate G60. Gate G60 is normally enabled to pass such signals to the signal input of gate G62. Gate G62, which is of the "or" type, is enabled to pass signals applied to either of its signal inputs, so that signals appearing at the output of amplifier A61 are passed through gates G61 and G62 and amplifier A62 and applied to the section of cable C50 extending beyond the Fig. 6 channel drop in the absence of signals from the control input of gate G60. The signals from termination MT50 passed through the channel drop and applied to the portion of cable C50 remote from the transmitting portion of termination MT50 are to be distributed to other channel drops and stations lying beyond the channel drop shown in Fig. 6.

It is pointed out that beyond the channel drop most remote from termination MT50, cable C50 is looped back on itself and returns through facilities in each channel drop including amplifiers A63 and A64 as well as gating means (not shown) in the case of Fig. 6 which are identical to those in the above-described lower portion of the Fig. 6 channel drop. For this reason, signals to be utilized at a station located at a particular channel drop may be diverted from the portion of cable C50 outgoing from or incoming to the transmitting and receiving portions, respectively, of termination MT50. The number of channel stations to which signals are to be sent from termination MT50 is limited only by the number of intelligence-bearing signal positions within each frame of signals present on cable C50. The stations may all be located at a single channel drop or distributed throughout various channel drops where the latter are located along the length of cable C50.

As previously mentioned, the Fig. 6 channel drop includes multiplex receive control 61 which is substantially identical to the one shown in Fig. 4 and described above and which, like the one in Fig. 4, is in continuous operation throughout the time that signals are being transmitted over cable C50. The synchronizing signals present in each frame of signals appearing at the output of amplifier A61 within Fig. 6 channel drops are applied to the input of multiplex receive control 61 in the same manner that the synchronizing signals present on highway RH51 are applied to the above-described signal inputs of gate CG40 and comparator RC40 in the Fig. 4 multiplex receive control. As a result, multiplex receive control 61 produces a signal on each of conductors R601–R620 corresponding to and in synchronism with each of the first twenty time positions in signal frames occurring on the output of amplifier A61 in the same fashion that the Fig. 4 multiplex receive control produces signals on each of conductors R1–R20 corresponding to and synchronized with the signal time positions occurring on highway RH61. Further, multiplex receive control 61 produces in the twenty-second time position of each signal frame appearing at the output of amplifier A66 a single pulse on conductor R622. The conductor R622 pulse is used for triggering the yet-to-be explained information transfer mechanisms within the station gates, such as 72, which are individually provided for each of the channel stations, such as CS1 at the Fig. 6 channel drop.

Of the conductors R601–R620, those conductors producing an impulse coincident with the time position of signals in each frame appearing at the output of amplifier A61 and which are intended for driving the receiving apparatus in channel stations located at the Fig. 6 channel drop, such as CS1 and CS20, are individually connected to apparatus within each of the station gates, such as 71 and 72, individual to stations CS1 and CS20 for reasons that are to be set forth presently. The other ones of conductors R601–R620 are left unconnected.

*Station gate.*—It is a first function of each station gate, such as 71, to convey signals from multiplex receive control 61 to inhibiting gate G60 signals to cause gate G60 to become blocked during the occurrence of the time position within each frame of signals received from termination MT50 occupied by signals intended for use at the station individual to that station gate in order to block the transmission of such signals along cable C50 beyond the channel drop at which the station gate is located. A further function of the station gate is to divert such blocked signals to the channel station receiving means. Another function of the station gate is to store digital signals received from its individual channel station transmitting means and to cause further gating means including control gate CG61 and "or" gate G62 to apply such stored signals to the part of cable C50 remote from the transmitting portion of termination MT50 for transmission along cable C50 to the receiving portion of termination MT50 in the same time position as the time position occupied by the signals blocked and diverted to that particular channel station receiving means. The apparatus for accomplishing these functions is next considered in detail.

Considering that signals in the first time position in each frame of signals occurring at the output of channel drop amplifier A61 are to be diverted to the receiving means within channel station CS1, signals applied to the aforementioned output conductor R601 of multiplex receive control 61 are passed through amplifier A71 and applied to the control inputs of receive gate GR71, receive repeater gate GR73, and transmit repeater gate GT75, within station gate 71 as well as to one of twenty signal inputs of "or" gate GO63 within the Fig. 6 channel drop. Turning first to the consideration of gate GO63, the amplified signal from conductor R601 is passed through gate GO63 and applied through amplifier A65 to the control input of inhibiting gate G60. Since each amplified signal appearing on the control input of gate G60 coincides with the first time position of each signal frame appearing at the output of amplifier A61, gate G60 is inhibited and therefore blocks passage of signals in the first time position only of frames of signals applied to the input of gate G60, if it be assumed, for the moment, that only station gate 71 and channel station CS1 are present at the Fig. 6 channel drop. These blocked signals in the first time position are to be utilized within the Fig. 6 drop and intended for use within receiving means at channel station CS1. In a similar manner, it is possible to cause gate G60 to block signals appearing at the output of amplifier A61 occurring at any of the first twenty time positions of each frame of time positions which are intended for distribution to the receiving means within another channel station, such as CS20, individual to the Fig. 6 channel drop.

The blocked, first time position signals are applied to channel drop receive path RP61 which is connected directly to the output of amplifier A61. Path RP61 is connected to the signal input of a receive gate within each channel drop station gate, such as gate GR71 of station gate 71. The amplified signals from conductor R601 on its control input, which coincide with the time position of blocked signals present on path RP61, enable gate GR71 to divert such blocked signals from cable C50 by passing them through itself to the "1" input of a flip-flop or other first bistable element 72. Element F71 is normally maintained in the "0" condition and is operable upon the application of a signal to its "1" input for storing the blocked signals intended for station CS1. To this end, the application of a single signal from path RP61 to its "1" input is effective for causing element F71 to apply a steady signal on its "1" output conductor. The "1" output conductor of element F71 is connected to the signal input of information transfer gate GI72.

After the occurrence of the remainder of the first twenty intelligence-bearing signal impulse time positions in the frame with the impulse which triggered element F71 to its "1" position, and upon the occurrence of the twenty-second time position in the same frame, the aforementioned impulse appearing on conductor 622 of multiplex receive control 61 is applied to the control inputs of information transfer gates and transmission gates within all station gates, such as gate GI72 and GT74, respectively, within station gate 71. Accordingly, gate GI72 is enabled in response to each such signal appearing on conductor R622 to pass any signal stored in element F71 to a second, signal storing flip-flop or other bistable element F72. This is accomplished by passing the signal on the "1" output conductor of element F71 through gate GI72 to the "1" signal input of element F72. Element F72, operated to its "1" condition, produces a steady signal on its "1" output. The output of gate GI72 is also connected to the "0" or reset input of element F71, so that a signal appearing on the output of gate GI72 is effective for restoring element F71 to its normal, "0" condition and thereby wiping out a signal stored in element F71. In this manner, first time position signals blocked in the Fig. 6 channel drop and stored within element F71 during the frame of signal time positions in which the blocked signal occurs, are reconstructed within element F71 in order to restore the signal, which may have been distorted in transmission to the output of amplifier A61 to its original, square form. Such a signal is then transferred to element F72 where it is amplified at the end of that frame of signals, in the manner next set forth.

The "1" output of bistable element F72 is connected to the signal input of receive repeater gate GR73, and a signal thereon subsequently is to be passed to receiving means CS1A within channel station CS1. The transfer of information stored in element F72 through gate GR73 is accomplished when the next signal appears on conductor R601 on the control input of gate GR73 to enable gate GR73. The signal passed through gate GR73 is also passed through amplifier A72, where it is amplified to the required level, and applied to receive path RP71 of line L71, which extends from station gate 71 to station CS1. Path RP71 is connected to the input of digital signal receiving means CS1A within channel station CS1. Receiving means CS1A is effective in the same manner as the one explained in connection with the receive portion of trunk termination 22 for demodulating the digital signals applied to the receive input of channel station CS1, and thereby producing a replica of the signal voltage on path IP1 of trunk TRK1. The replica signal at station CS1 is employed to drive a common telephone type receiver or other device (not shown) as required within station CS1.

The signal passed by gate GR73 and amplifier A72 is also applied to the input of differentiator D71, which amplifies the trailing edge of the impulse and applies the amplified signal to the "0" or reset input of element F72. The signal stored with element F72 is thereupon wiped out upon the return of element F72 to its normal or "0" condition.

From the above description, it is seen that signals in the first time position incoming to the Fig. 6 channel drop are reconstructed within station gate 72 and subsequently amplified and applied to the load individual to station CS1 upon the occurrence of the first time position in the next succeeding frame of signal time positions received at the output of amplifier A61. In the same manner, signals at other time positions in each frame of signals occurring at the output of amplifier A61 may be distributed to other station gates, such as 73 at the Fig. 6 channel drop, where they are reconstructed, amplified, and transmitted over a line to the receiving means within another channel station, such as CS20.

*Transmitting signals to cable C50 from a station*

Each channel station, such as CS1, is also equipped with transmitting means CS1B of the type described in connection with transmit portion of termination 22 for delta modulating analog signals generated by means such as a common telephone transmitter (not shown) which is located at station CS1. The station delta modulating means CS1B is operable independently of multiplex receive control 61 for producing .5 microsecond signal samples every twenty-five microseconds which are applied to transmit path TP72 of line L71, which conveys the signals to the input of other signal storing means within station gate 72.

Because transmitting means CS1B is not synchronized with the multiplex receive control 61 signals, and therefore, with the signal time positions appearing at the output of amplifier A61, it is necessary to store the signals from transmit means CS1B within station gate 71, and to apply the stored signals to cable C50 at some time thereafter, in the manner next set forth. A digital signal incoming to station gate 71 over path TP72 is passed through amplifier A73 to the "1" input of flip-flop or other bistable signal storing element F73. The application of such a signal to the input of element F73 is effective for transferring that element from its normal "0" condition to its "1" condition, whereupon it produces a signal on its "1" output.

Upon the appearance of the next signal on conductor R622 from multiplex receive control 61, transmit gate GT74 is enabled to pass the "1" signal generated by element F73 to the "1" input of flip-flop or other bistable element F74. Element F74 is thereby changed from its normal "0" condition to its "1" condition and produces a signal on its "1" output. The "1" output of gate GT74 is also connected to the reset or "0" input of element F73, so that the appearance of a signal on the "1" output of storage element F73 is also effective for restoring element F73 to its normal, "0" condition, i.e., wiping out the signal stored in element F73.

The "1" output of element F74 is connected to the control input of transmission repeater gate GT75, so that if element F74 is operated to produce a signal on its "1" output, gate GT75 is enabled to pass the next occurring signal appearing on conductor R601 and the output of amplifier A71 to the output of gate GT75. The output of gate GT75 is connected to the input of differentiator D72 which includes means for amplifying the trailing edge of signals appearing on the output of gate GT75 and passes the amplified signals through amplifier A74 to the reset or "0" input of element F74. Signals applied to the "0" input of element F74 cause that element to be restored to its normal, "0" condition, and the signal stored within element F74 is wiped out.

The output of gate GT75 is connected to transmit path TP62 of station gate 71, which is also connected to the outputs of gate corresponding to GT75 found in other station gates, such as 72, present at the Fig. 6 channel drop. Thus, it is seen that signals applied to path TP62 are in synchronism with the time positions of signals diverted from cable C50 for distribution to the channel stations present at the Fig. 6 channel drop. Specifically, the digital signals from station CS1 appear on path TP62 in synchronism with the first time position of signal position frames appearing at the output of amplifier A61 and present on path RP61.

Transmit path TP62 is connected to the signal input of control gate CG61. The passage of signals from path TP62 to the output of gate CG61 is controlled by signals applied to the left-hand, control input of gate CG61. The control input of gate CG61 is connected to the output of gate GO63. It is to be recalled that gate GO63 is enabled upon the appearance of a signal on each one of conductors R601–R620 to pass such signals to the output of gate GO63, and that each such signal corresponds to the time positions of signals distributed to the receive means at each of the channel stations at the Fig. 6 channel drop, such as CS1A. Consequently, gate CG61 is enabled to pass signals applied to conductor TP62 to the lower, signal input of "or" gate G62 of the Fig. 6 channel drop. The resulting signals appearing on the output of gate G62 are passed through amplifier A62 to the part of cable C50 remote from the transmit portion of termination MT50 with respect to the Fig. 6 channel drop. It is further obvious at this point that signals transmitted from path TP62 within the Fig. 6 channel drop from station CS1 are in the same time position in each frame of signals appearing at the output of amplifier A62 as the time position of signals diverted from cable C50 to the receive apparatus of station CS1.

Signals admitted to cable C50 from path TP62 are therefore transmitted along cable C50 in the same direction as signals transmitted from the transmitting portion of termination MT50, i.e., toward the receive portion of termination MT50. Because there are no other stations located at succeeding channel drops which utilize signals in the same signal frame time positions as the time positions of signals inserted on cable C50 from path TP62, signals from path TP62 and transmitted along cable C50 to the receive portion of termination MT50 do not interfere with other signals present on cable C50.

At termination MT50, the signals incoming from cable C50 are distributed in the previously described manner to the receive portions of the various trunk terminations. Thus, an analog signal that is a replica of the analog signal generated by the transmitting means at station CS1 is produced at the demodulator portion of trunk termination 22 and applied to path OP1 outgoing to switching equipment 21 from trunk termination 22.

*Repeaters*

Signals passing through the parts of cable C50 incoming from and outgoing to the transmitting and receiving portions of termination MT50, respectively, are repeated within each channel drop by amplifiers A62 and A64, respectively, before such signals are put on the line. The amplifiers are operative for reshaping the pulse train passing therethrough. Repeaters, such as R51, are also provided with amplifiers A51 and A52 for carrying out substantially the same function as amplifiers A62 and A64, respectively. The following paragraphs specifically describe the repeater R51. However, it is to be understood that analogous equipment is located in each channel drop, and that the channel drop equipment functions in a substantially identical manner.

In addition to being connected to the part of cable C50 outgoing from the repeater, the output of amplifiers A51 and A52 are also connected to the inputs of integrators I51 and I52, respectively. Integrators I51 and I52 are effective for detecting the continued presence of synchronizing impulses in the twenty-first and twenty-second time positions of each frame of signals repeated by its corresponding amplifier. During the time that input synchronizing impulses are supplied to the inputs of integrators I51 and I52, a signal is applied to the outputs of the integrators. The output of each integrator I51 and I52 is connected to one of the two inputs of gate GO51. The continued presence of a signal on the output of each of integrators I51 and I52 is effective for causing a continuing signal on the output of gate GO51, which is connected to the "1" input of element F51. Element F51 is effective in response to the presence of an input signal for withholding a signal from its "0" output conductor, which is connected to the control input of shunt gate GS52. When either or both amplifiers fail to produce any signal at their outputs over a predetermined number of impulse frames, the signal is removed from the output of the corresponding one of integrators I51 and I52. As a result, the input signal is removed from element F51 and element F51 is thereupon effective for producing a signal on its "0" output. The application of a signal to the control input of gate GS52 enables gate G52 to pass signals from its left-hand, signal input to its output.

Gate GS52 in enabled condition is effective for completing a low impedance path between the parts of cable C50 incoming from and outgoing to the transmit and receive portions, respectively, of termination MT50, so that signals transmitted from the transmit portion of termination MT50 to the repeating apparatus within repeater 51 are immediately returned to the receive portion of termination MT50 by way of gate GS52. The comparison of the normal transit time for signals over the length of cable C50 through all repeaters and channel drops may be compared to the transit time of signals returned from faulty repeater in order to locate the faulty repeater from the central office equipment.

While I have shown and described a specific embodiment of my invention, other modifications will readily occur to those skilled in the art. I do not therefore desire my invention to be limited to the specific arrangement shown and described, and I intend in the appended claims to cover all modifications which fall within the true spirit and scope of my invention.

What I claim is:

1. In a signal transmission system, a communciation channel, a terminal point including first transmitting means for transmitting digital signals at particular time positions within repetitive time position frames over said channel, a drop including first gating means serially connected to said channel at a point remote from said first transmitting means, said gating means having an input and being normally effective for passing signals transmitted from said terminal point along the length of said channel and operative in response to the application of a signal to said input for blocking the transmission of signals through said gating means, means at said drop having a plurality of output points for producing signals in sequence on each of said output points and in synchronism with the time positions of signals received at said drop from said first transmitting means, means for coupling a particular one of said output points to said gating means input whereby signals at a required time position within each frame of signals received at said drop may be blocked from further transmission along the length of said channel, a load for utilizing signals, means including second gating means for coupling said channel to said load, said second gating means having an input and being normally effective for blocking signals incoming to said second gating means from said channel and operative in response to the application of a signal to said input for passing signals to said load, and means for coupling to said second gating means input the one of said signal producing output points coupled to said first gating means input, whereby said second gating means is effective for diverting to said load the signals blocked by said first gating means.

2. In a signal transmission system, a communication channel, a terminal point including first transmitting means for transmitting digital signals at particular time positions within repetitive time position frames over said channel, a drop including first gating means serially connected to said channel at a point remote from said first transmitting means, said gating means having an input and being normally effective for passing signals transmitted from said terminal point along the length of said channel and operative in response to the application of a signal to said input for blocking the transmission of signals through said gating means, means at said drop having a plurality of output points for producing signals in sequence on each of said output points and in synchronism with the time positions of signals received at said drop from said first transmitting means, means for coupling a particular one of said output points to said gating means input whereby signals at a required time position within each frame of signals received at said drop may be blocked from further transmission along the length of said channel, means located at said drop for generating digital signals at the same rate as the frequency of occurrence of signals blocked by said first gating means, means including second gating means coupling said drop signal generating means to said channel at a point beyond said first gating means with respect to said first transmitting means, said second gating means having an input and being normally effective for blocking signals produced by said drop signal generating means and operative in response to the application of a signal thereto for causing said second gating means to pass signals from said drop signal generating means to said channel, and means for coupling to said second gating means input the one of said signal producing output points which is also coupled to said first gating means input, whereby signals from said drop signal generating means are applied to said channel in the time position of signals blocked by said first gating means.

3. The signal transmission system set forth in claim 2 and having in addition a load at said drop for utilizing signals, means including third gating means for coupling said channel to said load, said third gating means having an input and being normally effective for blocking signals incoming to said third gating means from said channel and operative in response to the application of a signal to said input for causing said third gating means to pass signals from said channel to said load, and means for coupling to said third gating means input the one of said signal producing output points coupled to said first and said second gating means inputs, whereby said third gating means is effective for diverting to said load the signals blocked by said first gating means.

4. The transmission system set forth in claim 3 wherein said channel is effective for returning signals inserted thereon at each of said drops to said terminal point, and having in addition means at said terminal point coupled to said channel for receiving signals transmitted from said drops, whereby simultaneous, non-interfering signals may be exchanged between said terminal point and each of said loads.

5. The signal transmission system set forth in claim 4 and having in addition means at said terminal point for receiving signals, and wherein said channel is effective for conveying signals from said drop to said receiving means, whereby signals may be exchanged in both directions between said terminal point and said drop.

6. In a signal transmission system having a channel for conveying digital signals occurring in a particular time position within frames of repetitive signal time positions, and a load for utilizing signals, the combination comprising: first and second signal storing means each having an input and an output, means for coupling said channel to said first storing means input, first gating means for coupling said first storing means output to said second storing means input, second gating means for coupling said second storing means output to said load, and control means coupled to said first and said second gating means for enabling said first gating means subsequent to the storage of a signal within said first signal storing means in order to cause said first storing means to spill a signal stored therein to said second storing means and for enabling said second gating means at a time subsequent to the passage of a signal thereto in order to spill a signal stored therein to said load, whereby a signal incoming from said channel is reconstructed in said storing means before being applied to said load.

7. The signal transmission system set forth in claim 6 wherein each of said storing means also includes a resetting input and is operative in response to the application of a signal thereto for wiping out a signal stored within the corresponding one of said storing means, and having in addition means for coupling said second storing means input to said resetting input of said first storing means, and means for coupling said load to said resetting input of said second storing means, whereby said first and said second storing means are repetitively reset and therefore operative to store signals from said channel and to spill signals reconstructed therein to said load.

8. The signal transmission system set forth in claim 6 wherein each of said storing means includes a resetting input operative in response to the application of a signal thereto for wiping out a signal stored within the corresponding one of said storing means, and having an addition means for coupling said second storing means input to said resetting input of said first storing means, and means for coupling said load to said resetting input of said second storing means, and wherein said control means is operative for repetitively enabling said first gating means at the same rate as the occurrence of and subsequent to each of the regularly recurring time positions of digital signals on said channel and subsequently enabling said second gating means, whereby each signal incoming to said first storing means from said channel in the particular, repetitively occurring time position is reconstructed within said gating means and subsequently applied to said load.

9. In a signal transmission system having a channel for conveying along its length digital signals occurring in a particular time position within frames of repetitive signal time positions, and a load for utilizing digital signals, the combination comprising: first and second bistable elements, each of said elements having a signal input, an output, and a reset input, each of said elements being operative in response to the application of a signal to the corresponding one of said signal inputs for producing a signal at the corresponding one of said outputs and further operative in response to the application of a signal to the corresponding one of said reset inputs for removing the signal from the corresponding one of said outputs, means for coupling said channel to said signal input of said first bistable element in order to cause said first bistable means to register the presence of a signal on said channel, first gating means for coupling said first bistable element output to said signal input of said second bistable element, means for coupling said signal input of said second bistable element to said reset input of said first bistable element, second gating means for coupling said second bistable element output to said load, means for coupling said load to said reset input of said second bistable element, and control means coupled to said first and said second gating means inputs for repetitively enabling said first gating means at the same rate as and subsequent in time to the occurrence of the time position of digital signals appearing on said channel in order to cause said first bistable element to spill a signal stored therein to said bistable element and to reset said first bistable element and for enabling said second gating means in synchronism with the time position of digital signals appearing on said channel in order to spill signals stored in said second bistable element to said load, whereby signals incoming from said channel are reconstructed in said bistable elements and applied to said load in synchronism with the occurrence of the regularly recurring time positions of signals on said channel.

10. In a signal transmission system having a channel for conveying digital signals occurring in a plurality of particular time positions within repetitive frames of signal time positions, and a load for utilizing digital signals occurring in said channel in a particular time position, the combination comprising: first and second signal storing means each having an input and an output, each of said storing means being operative in response to the application of a signal to the corresponding one of said inputs for producing a signal at the corresponding one of said outputs, first gating means for coupling said channel to said first storing means input, second gating means for coupling said first storing means output to said second gating means input, third gating means for coupling said second storing means output to said load, and control means coupled to said first and said third gating means for enabling said first and said third gating means in synchronism with the time position of a digital signal appearing on said channel in the particular time position of signals to be applied to said load in order to cause said first storing means to receive the signal appearing in that time position from said channel and to cause said second storing means to spill a signal stored therein to said load, said control means being further operative for enabling said second gating means at a time subsequent to the passage of a signal from said channel to said first storing means in order to spill a signal stored therein to said second storing means, whereby only a signal incoming from said channel at a particular time position within a frame of signal time positions is reconstructed within said storing means and subsequently applied to said load.

11. The signal transmission system set forth in claim 10 wherein each of said storing means also includes a resetting input operative in response to the application of a signal thereto for wiping out a signal stored within the corresponding one of said storing means, and having in addition means for coupling said second storing means input to said resetting input of said first storing means, and means for coupling said load to said resetting input of said second storing means, and wherein said control means is operative for repetitively enabling said first and said third gating means in synchronism with the regularly recurring time positions of digital signals on said channel intended for application to said load and for subsequently enabling said second gating means, whereby each signal incoming to said first storing means from said channel in the particular, repetitively occurring time position of the signals intended to be applied to said load is reconstructed within said gating means and subsequently applied to said load.

12. In a signal transmission system having a channel for conveying digital signals occurring in a plurality of particular time positions within repetitive frames of signal time positions from a source, and a load for utilizing digital signals occurring in a particular time position on said channel, the combination comprising: first and second signal storing means each having a signal input, an output and a reset input, each of said storing means being operative in response to the application of a signal to the corresponding one of said signal inputs for producing a signal at the corresponding one of said outputs and further operative in response to the application of a signal to the corresponding one of said reset inputs for removing a signal from said output, first gating means for coupling said channel to said first storing means signal input, second gating means for coupling said first storing means output to said second gating means input, third gating means coupling said second storing means output to said load, fourth gating means in series with said channel beyond said first gating means with respect to said signal source, each of said first, said second, and said third gating means being normally effective for blocking the passage of signals therethrough and capable of being enabled to pass signals therethrough, said fourth gating means being normally effective for passing signals from said source along the length of said channel and operative for inhibiting the passage of signals therethrough, control means coupled to said first, said third, and said fourth gating means for enabling said first and said third gating means in synchronism with the time positions of digital signals appearing on said channel in the particular time position of signals to be applied to said load and for simultaneously inhibiting said fourth gating means in order to block the passage along said channel and to cause said first storing means to receive the signals appearing in that time position from said channel, and in order to cause said second storing means to spill a signal stored therein to said load and to reset said second storing means, said control means being further operative at a time subsequent to the occurrence of the particular time position of the signals to be applied to said load for enabling said second gating means in order to cause said first storing means to spill a signal stored therein to said second storing means and to reset said first storing means whereby only signals occurring within each frame of time positions at the particular time position intended for application to said load are blocked from further passage along said channel and are reconstructed within said storing means and subsequently applied to said load.

13. In a signal transmission system having a channel for conveying along its length digital signals occurring in a particular time position within frames of repetitive signal time positions, and a load for utilizing digital signals, the combination comprising: first and second bistable elements each having a signal input, an output, and a reset input, each of said elements being operative in response to the application of a signal to said signal input for producing a signal at said output and further operative in response to the application of a signal to said reset input for removing the signal from said output, first gating means for coupling said channel to said signal input of said first element, second gating means for coupling said first element output to said signal input of said second element, means for coupling said signal input of said second element to said reset input of said first element, third gating means for coupling said second element output to said load, means for coupling said load to said reset input of said second element, and control means coupled to said first, said second, and said third gating means repetitively operative for enabling said first and said third gating means in synchronism with the time position of digital signals appearing on said channel in order to admit signals from said channel to said first element, to cause said second element to spill a signal stored therein to said load, and to reset said second element and for subsequently enabling said second gating means in order to spill signals stored in said first element to said load, whereby signals incoming from said channel are reconstructed within said elements before application to said load.

14. In a signal transmission system having a channel for conveying along its length digital signals occurring in particular time positions within frames of repetitive signal time positions, and a plurality of loads for utilizing digital signals, the combination comprising: a plurality of station gates, each station gate being individual to one of said loads including first and second bistable elements and first and second gating means, each of said bistable elements having a signal input, an output, and a reset input, each of said elements being operative in response to the application of a signal to said signal input for producing a signal at said output and further operative in response to the application of a signal to said reset input for removing the signal from said output, means for coupling said channel to said signal input of said first bistable element, said first gating means within each of said station gates being operative for coupling said output of said first bistable element within the same one of said station gates to said signal input of said second bistable element, means within each of said station gates for coupling said signal input of said second bistable element to said reset input of said first bistable means, said second gating means of each of said station gates being operative for coupling said second bistable element output to the corresponding one of said loads, means within each of said station gates for coupling said load to said reset input of said second bistable element, and control means common to said station gates coupled to said first and said second gating means within each of said station gates for repetitively enabling said first gating means at a time subsequent to the occurrence of the time position of digital signals on said channel intended for application to the corresponding one of said loads in order to cause said first bistable element within each station gate to spill a signal stored therein to said second bistable element and to reset said first bistable element and for enabling said second gating means in synchronism with the occurrence of the time position of digital signals appearing on said channel intended for application to the corresponding one of said loads in order to cause said second bistable element within each station gate to spill signals stored therein to the corresponding one of said loads and to reset said second bistable element, whereby signals incoming from said channel to each of said station gates are reconstructed within said station gates before being applied to the corresponding one of said loads.

15. In a signal transmission system having a channel for conveying digital signals occurring in a plurality of particular time positions within repetitive frames of signal time positions from a source and a load for utilizing digital signals occurring in a particular time position on said channel, the combination comprising: first and second bistable elements each having a signal input, an output and a reset input, each of said bistable elements being operative in response to the application of a signal to the corresponding one of said signal inputs for producing a signal at the corresponding one of said outputs and further operative in response to the application of a signal to the corresponding one of said reset inputs for removing a signal from said output, first gating means for coupling said channel to said first bistable element signal input, second gating means for coupling said first bistable element output to said second gating means input, third gating means coupling said second bistable element output to said load, fourth gating means in series with said channel beyond said first gating means with respect to said signal source, each of said first, said second and said third gating means being normally effective for blocking the passage of signals therethrough and capable of being enabled to pass signals therethrough, said fourth gating means being normally effective for passing signals from said source along the length of said channel and operative for blocking the passage of signals therethrough, means for coupling said second bistable element signal input to said first bistable element reset input and means for coupling said load to said second bistable element reset input, control means coupled to said first, said third, and said fourth gating means for enabling said first and said third gating means in synchronism with the time positions of digital signals appearing on said channel in the particular time position of signals to be applied to said load and for simultaneously inhibiting said fourth gating means in order to block the passage along said channel and to cause said first bistable element to receive the signals appearing in that time position from said channel, and in order to cause said second bistable element to spill a signal stored therein to said load and to reset said second bistable element, said control means being further operative at a time subsequent to the occurrence of the particular time position of the signals to be applied to said load on said channel for enabling said second gating means in order to cause said first bistable element to spill a signal stored therein to said second bistable element and to reset said first bistable element, whereby only signals occurring within each frame of time positions at the particular time position intended for application to said load are blocked from further passage along said channel, reconstructed within said bistable means and subsequently applied to said load.

16. In a signal transmission system having means for generating digital signals spaced apart in time and a channel for conveying signals along its length, the combination comprising: storing means having an input and an output operative in response to the application of a signal to said input for producing a signal on said output, means for coupling said generating means to said storing means input, gating means for coupling said storing means output to said channel, said gating means being normally effective for blocking the passage of signals therethrough and capable of being enabled to pass signals from said storing means output to said channel, control means having an output coupled to said gating means, said control means being operative for defining recurring frames of time positions and for producing on said control means output a signal in coincidence with a particular one of said time positions, whereby signals produced within said generating means are applied to said channel in a particular time position of repetitively occurring time positions, said channel having an additional portion extending from said station for conveying signals from a remote source toward said station, and having in addition inhibiting means serially connected between the portion of said channel over which signals from said station are transmitted and said additional portion, said inhibiting means being normally effective for passing signals therethrough and having an input responsive to the application of a signal thereto operative for blocking the passage of signals through said inhibiting means, means for coupling said control means second output to said inhibiting means input, whereby signals incoming to said station from said channel means in the time position occupied by signals transmitted from said station over said channel are blocked from further passage along the length of said channel at said inhibiting means, additional storing means having an input and output operative in response to the application of a signal to said input for producing a signal on said output, and additional gating means having an input coupled to said channel between said remote source and said inhibiting means, said additional gating means being normally effective for blocking the passage of signals therethrough and capable of being enabled to pass signals from said channel to said additional storing means input, and means for coupling said control means second output to said additional gating means, whereby signals from said remote source arriving at said inhibiting means in coincidence with the time position of signals transmitted from said station are diverted from said channel to said additional storing means.

17. The signal transmission system set forth in claim 16 and having in addition a load at said station, other gating means normally effective for blocking the passage of signals therethrough and operative for coupling said additional storing means output to said load, and means for coupling said control means first output to said gating means in order to enable said gating means to pass a signal from said additional storing means to said load, whereby signals diverted from said channel are applied to said load.

18. In a signal transmission system having a station comprising means for generating digital signals spaced apart in time, and a channel for conveying signals away from said station, the combination comprising: first and second signal storing means each having a signal input and an output, each of said storing means being operative in response to the application of a signal to said input for producing a signal at said output, means for coupling said signal generating means to said first storing means input, first gating means for coupling said first storing means output to said second storing means input, means including second gating means for coupling said second storing means output to said channel, said first and said second gating means being normally effective for blocking the passage of signals therethrough and capable of being enabled to pass signals to second storing means input and to said channel, respectively, control means having first and second outputs coupled to said first and said second gating means, respectively, said control means being operative for defining recurring frames of time positions and for producing on said second output a signal in coincidence with a particular time position and for producing on said first output a signal at a subsequent one of the time positions, whereby said first storing means spills a signal stored therein to said second storing means during the occurrence of a first frame of time positions and a signal stored in said second storing means is spilled to said channel at the particular time position within the next occurring frame of time positions defined by said control means.

19. The signal transmission system set forth in claim 18 wherein each of said storing means also includes a resetting input operative in response to the application of a signal thereto for wiping out a signal on said output of the corresponding one of said storing means, and having in addition means for coupling said second storing means signal input to said resetting input of said first storing means, and means for coupling said second storing means output to said resetting input of said second storing means, whereby said first and said second storing means are repetitively operative to store signals from said signal generating means within said first storing means during the occurrence of the first of a pair of time position frames and to spill signals stored within said second storing means to said channel during the occurrence of the second of a pair of time position frames.

20. In a signal transmission system having a plurality of stations, each of said stations comprising means for generating digital signals spaced apart in time, and a channel for conveying signals away from said stations, the combination comprising: a plurality of station gates, each of said station gates being individual to a particular one of said stations and including first and second signal storing means, each of said storing means having an input and an output and being operative in response to the application of a signal to said input for producing a signal at said output, means for coupling said signal generating means of each of said stations to the corresponding one of said first storing means inputs, first gating means within each of said station gates for coupling the corresponding one of said first storing means outputs to the corresponding one of said second storing means inputs, means including second gating means in each of said station gates for coupling the corresponding one of said second storing means outputs to said channel, said first and said second gating means within each of said station gates being normally effective for blocking the passage of signals therethrough and capable of being enabled to pass signals to said second storing means input and to said channel, respectively, control means having a common output connected to said first gating means within each of said station gates and a plurality of individual outputs, each of said individual control means outputs being connected to said second gating means within a particular one of said station gates, said control means being operative for defining recurring frames of time positions and for producing on each of said individual outputs a signal in coincidence with a particular time position which is different from the time position of signals occurring on all other of said individual outputs and for producing on said common output a signal at a position subsequent to the time positions of signals occurring on said individual outputs, whereby said first storing means within each of said station gates spills a signal received at any time from the corresponding one of said stations to said second storing means at a time position common to all stations and a signal stored within said second storing means within any of said station gates is spilled to said channel within the next occurring frame of time positions defined by said control means at a time position which is different from the time positions of all other signals admitted to said channel from the others of said station gates.

21. The signal transmission system set forth in claim 20 wherein said channel has an additional portion extending to said stations for conveying signals from a remote source toward said stations and having in addition inhibiting means connected serially between the portion of said channel over which signals are conveyed toward said stations from the portion of said channel over which signals are transmitted away from said stations, said inhibiting means being normally effective for passing signals therethrough and having an input responsive to the application of a signal thereto for blocking the passage of signals through said inhibiting means, and having gating means for coupling said control means individual outputs to said inhibiting means input, whereby signals incoming to said stations from said channel in the time positions occupied by signals transmitted from said stations over said channel are blocked from further passage along the length of said channel at said inhibiting means.

22. The signal transmission system set forth in claim 21 and having in addition additional storing means in each of said station gates, each of said additional storing means having an input and an output and being operative in response to the application of a signal to said input for producing a signal on said output, and additional gating means in each of said station gates having an input coupled to said channel between said remote source and said inhibiting means, said additional gating means being normally effective for blocking the passage of signals therethrough and capable of being enabled to pass signals from said channel to the corresponding one of said additional storing means inputs and means for coupling each of said control means individual outputs to the corresponding one of said additional gating means, whereby signals from said remote source arriving at said inhibiting means in coincidence with the time positions of signals transmitted from the various ones of said stations are diverted from said channel to said additional storing means within the station gate corresponding to the station from which signals are sent.

23. The signal transmission system set forth in claim 22 and having in addition a load at each of said stations and additional gating means in each of said stations normally effective for blocking the passage of signals therethrough and operative for coupling said additional storing means output to said load in the corresponding one of said stations, and means for coupling said control means common output to said additional gating means in each of said station gates in order to enable said additional gating means to pass a signal from said additional storing means to the load at the corresponding one of said stations.

24. In a repeater station, first and second channels, each of said channels having a first portion incoming to said repeater station and a second portion outgoing from said repeater station for conveying signals to and from said repeater station, respectively, first and second means for repeating signals from said first to said second portions of said first and said second channels, respectively, means including a gate having a signal input and an output for coupling said first portion of said first channel to said second portion of said second channel, said gate being normally effective for blocking the passage of signals therethrough and having a control input, said gate being operative in response to the application of a signal to said control input for enabling said gating means to pass signals from said first to said second channel, and first and second means for controlling said gate, each of said first and said second controlling means having an input coupled to said second portions of said first and said second channels, respectively, and an output means for coupling said controlling means outputs to said gate control input, each of said first and said controlling means being operative in the absence of signals on said second portions of said first and said second channels, respectively, for a predetermined time interval for applying a signal to said controlling means input, whereby signals are diverted from said first channel first portion to said second channel second portion upon the failure of either of said repeating means to apply signals to said second portions of said channel for a predetermined time interval.

25. In a communication system, a termination point including means for transmitting signals and means for receiving signals, a station remote from said termination point including means for transmitting signals and means for receiving signals, a channel having first and second sections extending between said termination point transmitting means and said station receiving means, and between said station transmitting means and said termination point receiving means, respectively, for conveying signals between said termination point and said station, a repeater station in said channel at a point between said termination point and said station, said repeater station including first means connected serially in said first and said second channel sections for repeating signals transmitted to said station and said termination point, respectively, means including a gate at said repeater station for coupling said first channel section and said second channel section at a point between said termination point and said repeater station, said gating means normally being effective for blocking the passage of signals therethrough and having a control input, said gating means being operative in response to the application of a signal to said control input for enabling said gating means to pass signals from said first to said second channel portions, first and second detecting means having inputs coupled to said first and said second channels at points between said repeater station and said station and between said repeater station and said termination point, respectively, and a common output coupled to said gating means control input, each of said detecting means being operative in response to the absence of a signal from its input for a predetermined interval for applying a signal to said gating means control input, whereby signals incoming to said repeater station from said terminal point are diverted to said second channel section for return to said terminal point receiving means upon the failure of either of said repeating means to apply a signal on the corresponding one of said channel portions for a predetermined time interval.

26. In a signal transmission system having a highway, transmitting means for defining and applying signals to said highway in ones of time positions including a recognition signal of particular characteristics in a particular time position within repetitively occurring frames of time positions, receive control means including a counter having an input and being operative in response to the application of signals to said input for defining frames of time positions equal in number to the number of time positions in frames of signals defined by said transmitting means, a master clock for producing signals at substantially the same rate as the rate of occurrence of time positions defined by said transmitting means, means including an inhibiting gate normally operative for coupling said master clock to said counter input, said inhibiting gate having a control input and being operative in response to the application of a signal thereto for blocking the passage of signals from said clock to said counter, said receive control means also including a plurality of outputs and means operative under the control of said counter for producing on each of said outputs a signal in certain of the time positions occurring on said highway, recognition means having an input and an output coupled to said inhibiting gate control input, said recognition means being operative in response to the application to said recognition means input of a signal of the character of the recognition signal applied to said highway for withholding a signal from said recognition means output, and means including a second gate having first and second inputs coupled to said highway and to the one of said receive control means outputs bearing a signal in the time position occupied by the recognition signal present on said highway, respectively, and an output, said second gate being operative in response to the application to its inputs of coincidental signals for passing signals from said highway to said recognition means input, whereby said receive control means counter is slipped until frames of signals defined thereby coincide with frames of time positions applied to said highway by said transmitting means.

References Cited in the file of this patent

UNITED STATES PATENTS

| | | |
|---|---|---|
| 2,429,613 | Deloraine et al. | Oct. 28, 1947 |
| 2,547,001 | Grieg | Apr. 3, 1951 |